(12) United States Patent
Thompson et al.

(10) Patent No.: US 7,553,437 B2
(45) Date of Patent: Jun. 30, 2009

(54) METHOD AND MOLD ASSEMBLY FOR MAKING A MOLDED FOAM ARTICLE

(75) Inventors: Matthew A. Thompson, New Milford, CT (US); Timothy T. Oberle, Greenville, SC (US); John J. Corrigan, III, Washington, CT (US); Robert D. Wheeler, Fairfield, CT (US)

(73) Assignee: Sealed Air Corporation (US), Duncan, SC (US)

( * ) Notice: Subject to any disclaimer, the term of this patent is extended or adjusted under 35 U.S.C. 154(b) by 52 days.

(21) Appl. No.: 11/801,540

(22) Filed: May 10, 2007

(65) Prior Publication Data
US 2008/0277816 A1 Nov. 13, 2008

(51) Int. Cl.
*B29C 44/42* (2006.01)

(52) U.S. Cl. .................... 264/46.8; 264/45.1; 264/46.6; 264/292; 53/427

(58) Field of Classification Search .............. 264/45.1, 264/46.8, 292; 53/427, 472
See application file for complete search history.

(56) References Cited

U.S. PATENT DOCUMENTS

| | | | |
|---|---|---|---|
| 1,702,253 A | 2/1929 | Elliot | |
| 3,051,991 A | 9/1962 | Hanzel | |
| 3,618,287 A * | 11/1971 | Goghai et al. | 53/472 |
| 3,801,244 A | 4/1974 | Eisenberg | |
| 3,853,218 A | 12/1974 | Grasvoll | |
| 4,164,109 A | 8/1979 | Dubois | |
| 4,519,569 A | 5/1985 | Nolan | |
| 4,555,895 A | 12/1985 | Torre | |
| 4,583,348 A | 4/1986 | Treiber et al. | |
| 4,584,822 A * | 4/1986 | Fielding et al. | 53/452 |
| 4,709,531 A | 12/1987 | Denda | |
| 4,759,891 A | 7/1988 | Reichental | |
| 4,761,257 A | 8/1988 | Bunn | |
| 4,796,405 A | 1/1989 | Owen et al. | |
| 4,920,731 A | 5/1990 | Rimondi et al. | |
| 5,027,583 A | 7/1991 | Chelak | |
| 5,085,568 A * | 2/1992 | Turgeon et al. | 425/125 |
| 5,127,813 A | 7/1992 | Omata et al. | |
| 5,164,137 A * | 11/1992 | Omata et al. | 264/46.6 |

(Continued)

FOREIGN PATENT DOCUMENTS

EP 1 579 973 A2 3/2005

(Continued)

*Primary Examiner*—Steven P Griffin
*Assistant Examiner*—Jacob Thomas Minskey
(74) *Attorney, Agent, or Firm*—Thomas C. Lagaly

(57) ABSTRACT

A mold assembly for making a molded foam article generally includes a housing having an internal cavity and an opening into the cavity, a movable support member movable between an inner position and an outer position, an object supported by the support member and having a three-dimensional shape, and a closure. A method for making a molded foam article generally includes moving the support member to the outer position, positioning a film web over the object to form a substantially convex envelopment, moving the support member to the inner position while maintaining the film web in contact with the object to reconfigure the substantially convex film envelopment into a partially concave film envelopment, and dispensing a predetermined amount of a foamable composition into the hollow space provided by the concave envelopment.

11 Claims, 19 Drawing Sheets

U.S. PATENT DOCUMENTS

| | | |
|---|---|---|
| 5,255,847 A | 10/1993 | Sperry et al. |
| 5,376,219 A | 12/1994 | Sperry et al. |
| 5,383,326 A | 1/1995 | Dean et al. |
| 5,473,861 A * | 12/1995 | Fukunaga et al. .............. 53/441 |
| 5,528,881 A | 6/1996 | Cappi et al. |
| 5,603,968 A | 2/1997 | Tajiri et al. |
| 5,728,333 A | 3/1998 | Tabata et al. |
| 5,776,510 A | 7/1998 | Reichental et al. |
| 5,840,225 A | 11/1998 | Kikuchi et al. |
| 5,950,875 A | 9/1999 | Lee et al. |
| 6,003,288 A | 12/1999 | Sperry et al. |
| 6,185,913 B1 | 2/2001 | Cappi et al. |
| 6,189,302 B1 | 2/2001 | Kudo et al. |
| 6,386,850 B1 | 5/2002 | Salerno et al. |
| 6,718,736 B2 | 4/2004 | Oguri et al. |
| 6,834,476 B2 | 12/2004 | Konishi |
| 6,925,777 B2 | 8/2005 | Fresnel |
| 6,929,193 B2 | 8/2005 | Ruddy |
| 6,996,956 B2 | 2/2006 | Sperry et al. |
| 6,998,085 B2 | 2/2006 | De Winter et al. |
| 7,124,555 B2 | 10/2006 | Torre |

FOREIGN PATENT DOCUMENTS

| | | | |
|---|---|---|---|
| GB | 2 219 237 A | 6/1988 | |

* cited by examiner

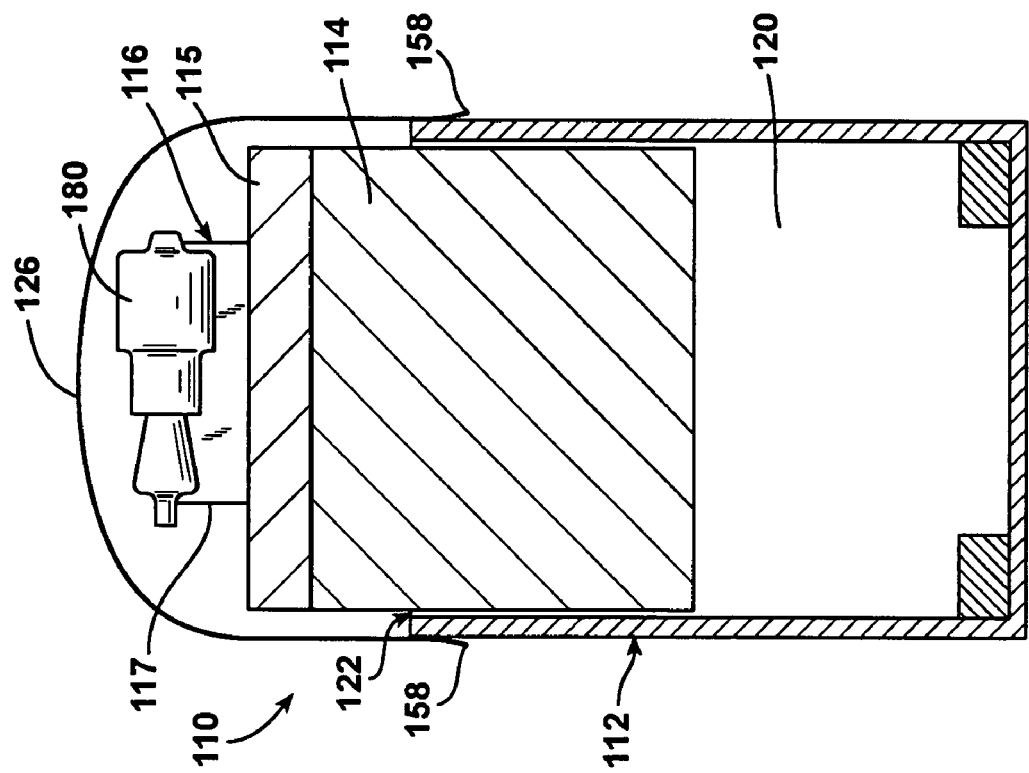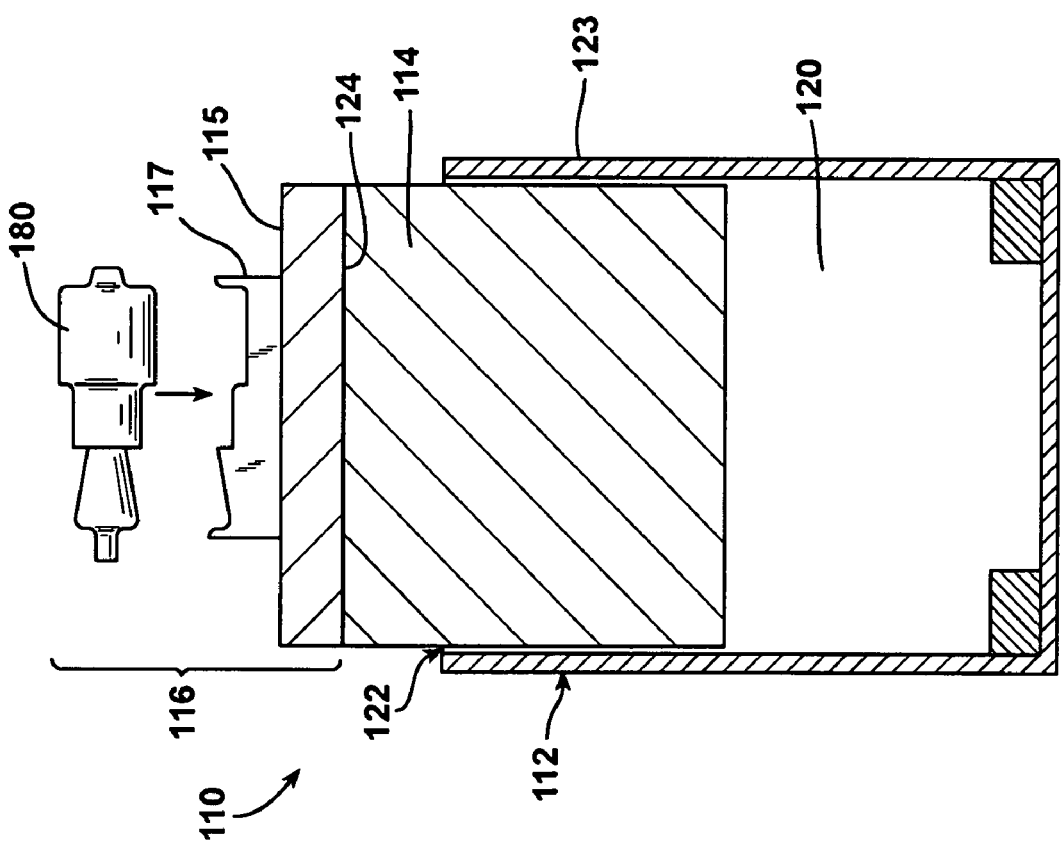

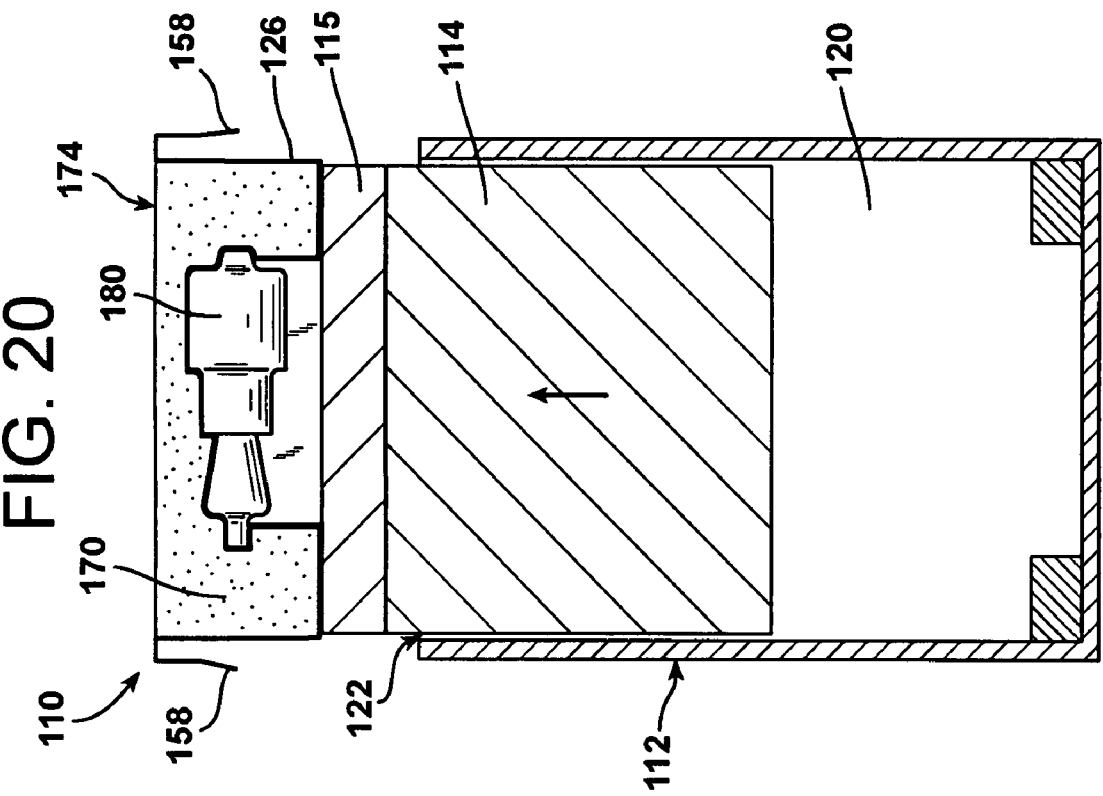
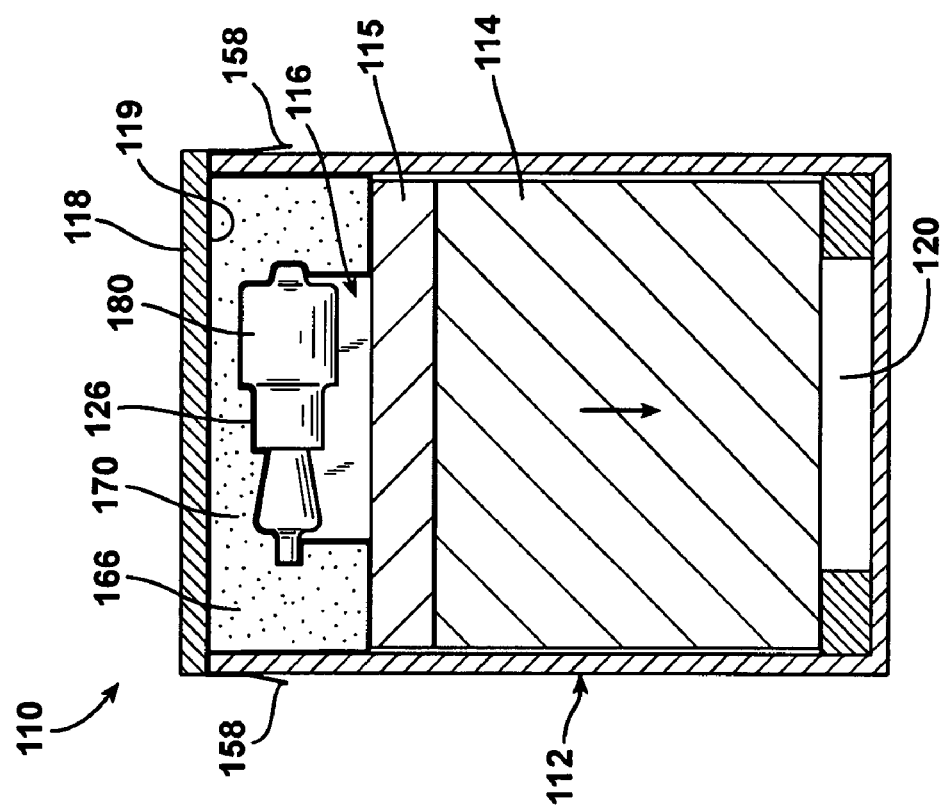

METHOD AND MOLD ASSEMBLY FOR MAKING A MOLDED FOAM ARTICLE

BACKGROUND OF THE INVENTION

The present invention relates to molded foam articles. More specifically, the invention relates to a method and mold assembly to allow molded foam articles to be produced with a film web interposed between the foam and the mold assembly.

Foam-in-place packaging is a highly useful technique for on-demand protection of packaged products. In its most basic form, foam-in-place packaging comprises injecting foamable compositions from a dispenser into a container that holds a product to be cushioned. Typically, the product is wrapped in plastic to keep it from direct contact with the rising (expanding) foam. As the foam rises, it expands into the remaining space between the product and its container (e.g. a box formed of corrugated paperboard), thus forming a custom cushion for the product.

A common foaming composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged product.

In other types of foam-in-place packaging, the foam precursors are injected into a plastic bag, which is then dropped into a container holding the product to be cushioned. The rising foam again tends to expand into the available space, but does so inside the bag. Because the bags are formed of flexible plastic, they form individual custom foam cushions for the packaged products. In several techniques, a specific apparatus is used to make the bag from plastic film while concurrently injecting it with foam. Exemplary devices are assigned to the assignee of the present invention, and are illustrated, for example, in U.S. Pat. Nos. 5,027,583, 5,376,219, and 6,003,288, the contents of each of which are hereby incorporated entirely herein by reference thereto.

In other packaging applications, similar or identical products are repeatedly placed in similar or identical orientations in similar or identically sized containers. Such circumstances increase the need for more standard packaging elements that have a consistent size and shape.

U.S. Pat. Nos. 5,776,510 and 6,386,850, the contents of each of which are hereby incorporated entirely herein by reference thereto, disclose methods and apparatus for automatically molding defined three-dimensional polyurethane foam cushions utilizing the foam-in-place techniques discussed above, but with the added feature of placing a bag containing a foamable composition in a mold as the composition begins to form foam, and maintaining the bag in the mold until the composition has finished forming a foam cushion in a shape conforming to the shape of the mold. These inventions have beneficially combined the advantages of on-demand, foam-in-place packaging with the ability to produce standard packaging cushions having a consistent size and shape.

While the forgoing molding techniques have been highly successful, the inventors hereof have determined that for complex and/or deep-draw mold shapes, the process of placing ("tucking") the film into the crevices and cavities of the mold can be difficult and ineffective, resulting in molded foam cushions that conform poorly to the mold shape.

Accordingly, a need exists in the art for an improved method and apparatus for making molded foam articles having a complex and/or deep-draw configuration.

SUMMARY OF THE INVENTION

That need is met by the present invention, one aspect of which pertains to a method for making a molded foam article, comprising:
  a. providing a mold assembly, comprising
   (1) a housing having an internal cavity and an opening into the cavity,
   (2) a movable support member, the support member being movable between
    (a) an inner position, in which the support member is substantially contained within the cavity, and
    (b) an outer position, in which at least a portion of the support member extends outside of the cavity via the opening,
   (3) an object having a three-dimensional shape and being supported by the support member, and
   (4) a closure, which is adapted to assume a closed position to enclose the support member within the cavity;
  b. moving the support member to the outer position;
  c. positioning a film web over the object to thereby form a substantially convex envelopment over the object;
  d. moving the support member to the inner position while maintaining the film web in contact with the object to thereby reconfigure the substantially convex film envelopment into a partially concave film envelopment, wherein the film forms a hollow space of predetermined shape and the object causes a portion of the film to protrude into the hollow space;
  e. dispensing a predetermined amount of a foamable composition into the hollow space; and
  f. moving the closure to the closed position,
  whereby, the foamable composition expands within the hollow space to form a molded foam article that substantially conforms to the predetermined shape, with the film web forming at least a partial outer skin for the article.

Another aspect of the present invention is directed to a mold assembly for making a molded foam article, comprising:
  a. a housing having an internal cavity and an opening into the cavity;
  b. a movable support member, the support member being movable between
   (1) an inner position, in which the support member is substantially contained within the cavity, and
   (2) an outer position, in which at least a portion of the support member extends outside of the cavity via the opening;
  c. an object having a three-dimensional shape and being supported by the support member; and
  d. a closure, which is adapted to assume a closed position to enclose the support member within the cavity,
   wherein:
   the mold assembly is adapted to allow a film web to be positioned over the object to thereby form a substantially convex envelopment over the object when the support member is in the outer position; and
   the mold assembly is further adapted to allow the support member to be moved to the inner position while maintaining the film web in contact with the object to thereby reconfigure the substantially convex film envelopment into a partially concave film envelopment, wherein the film forms a hollow space of predetermined shape and the object causes a portion of the film to protrude into the hollow space, whereby, when a predetermined amount of a foamable composition is dispensed into the hollow space and the closure is moved to the closed position, the foamable composition expands within the hollow space to form a molded foam article that substantially conforms to the predetermined shape, with the film web forming at least a partial outer skin for the article.

The internal shape of the mold, i.e., the shape of the hollow space within the mold housing that defines the shape of the molded foam article, is generally determined by the relative configuration of the object and internal cavity when the support member is in its inner position. Advantageously, by positioning the film web over the object when it is outside of the mold housing, i.e., when the support member is in its outer position, the film can more easily and effectively be made to conform to such object. By then maintaining the film in contact with the object as it is moved to the inner position inside of the mold housing, a complex and/or deep-draw mold that is fully lined with a conforming film web may be achieved.

BRIEF DESCRIPTION OF THE DRAWINGS

FIGS. 13-21 illustrate an alternative method for making a molded foam article, which is similar to the method illustrated in FIGS. 1-9 except that the object is a product to be packaged, with the molded foam article forming a packaging cushion for the product;

DETAILED DESCRIPTION OF THE INVENTION

Figure 4:
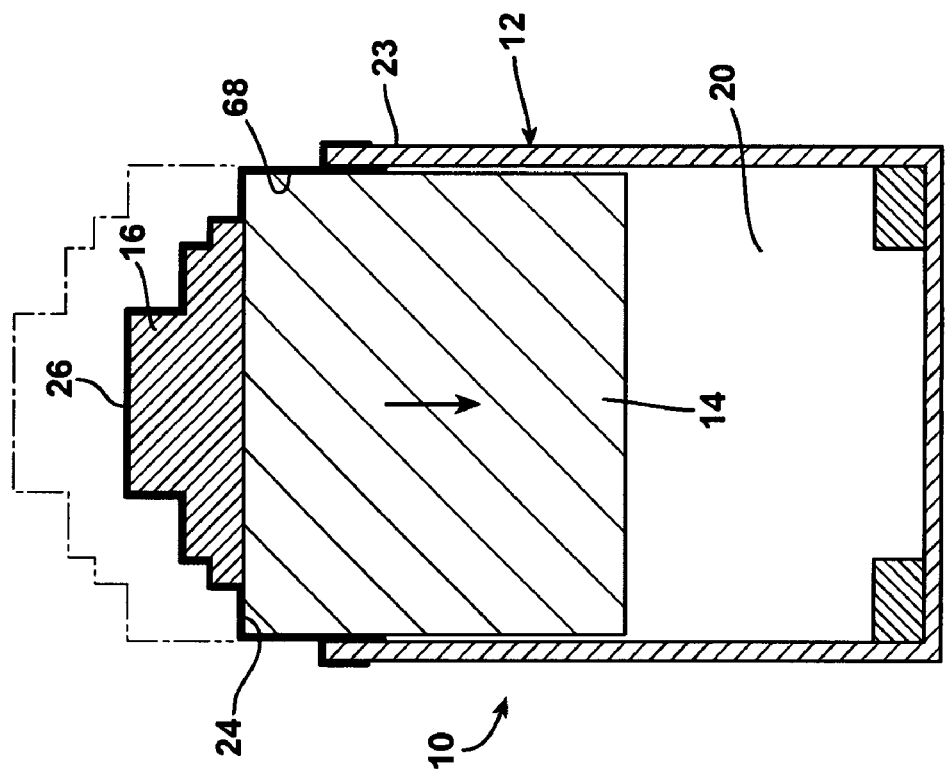
FIG. 4 is similar to FIG. 3, except that the support member is now in its inner position while maintaining the film web in contact with the object to thereby reconfigure the substantially convex film envelopment into a partially concave film envelopment, wherein the film forms a hollow space of predetermined shape and the object causes a portion of the film to protrude into the hollow space.
Figure 5:
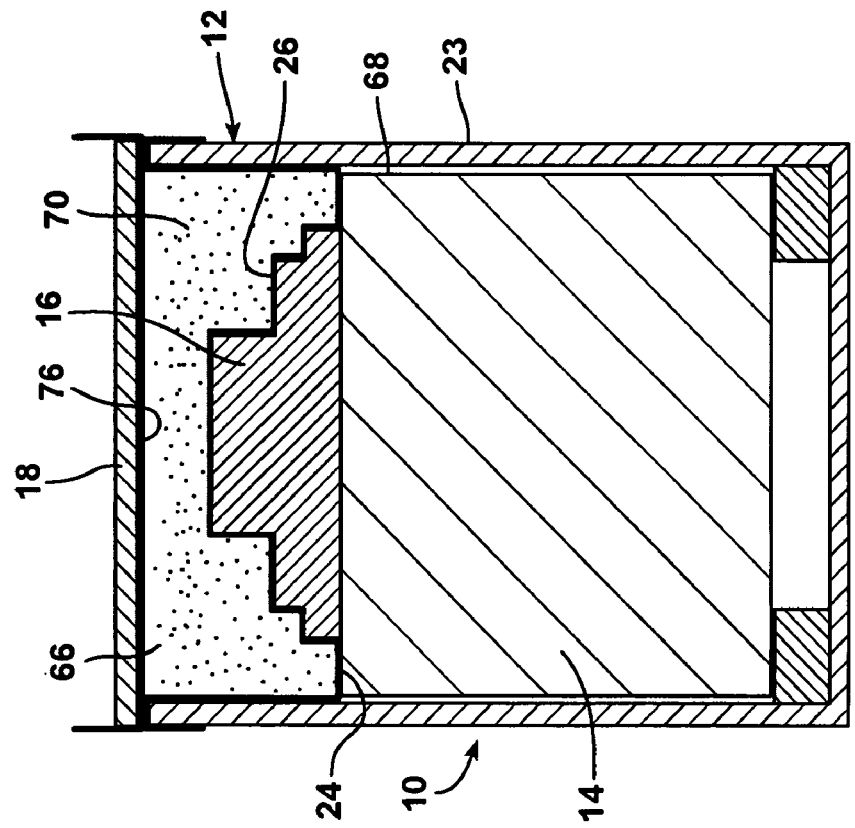
FIG. 5 is similar to FIG. 4, except that a predetermined amount of a foamable composition is being dispensed into the hollow space.
Figure 6:
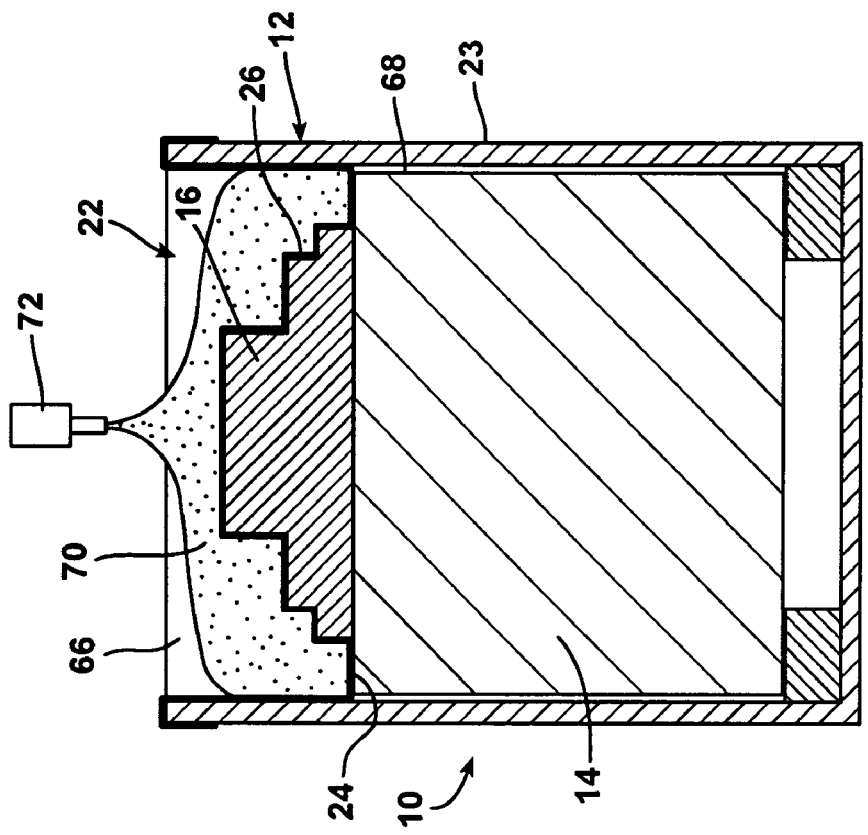
FIG. 6 is similar to FIG. 5, except that a mold closure is moved to a closed position.
Figure 8:
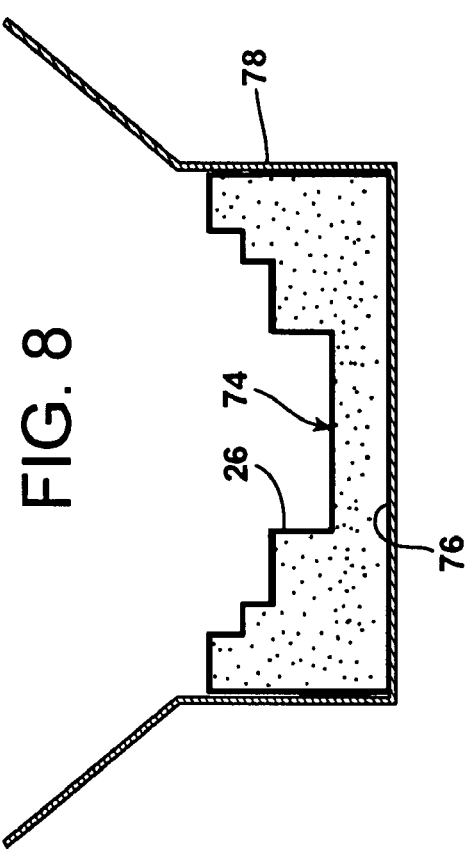
FIG. 8 illustrates the placement of the molded foam article from FIG. 7 into a container.

Referring to FIGS. 1-9, a method for making a molded foam article in accordance with the present invention will be described. A mold assembly 10 may be employed, which may generally include a housing 12, a movable support member 14, an object 16, and a closure 18 (FIG. 6).

Housing 12 may include an internal cavity 20 and an opening 22 into the cavity. Housing 12 may further include one or more walls 23 such that the cavity 20 is bounded, at least in part, by such wall(s) 23. In some embodiments, housing 12 may be generally cylindrical in shape, in which case it may include one continuous wall 23. In other embodiments, housing 12 may have a generally square or rectangular cross-sectional shape (in plan view), in which case it may include four walls 23. Other plan-view shapes are, of course, possible, e.g., hexagonal configurations that include six walls, octagonal configurations that include eight walls, etc.

Support member 14 is generally movable between an inner position and an outer position, and may be moved via any conventional actuation mechanism, e.g., manually, mechanically, electro-mechanically, pneumatically, hydraulically, etc. (actuation mechanism not shown). The movable support member is shown in the inner position in FIGS. 4-6. In such inner position, support member 14 is substantially contained within internal cavity 20 of housing 12. FIGS. 1-3 and 7 illustrate the movable support member 14 in the outer position, in which at least a portion of the support member extends outside of cavity 20 via opening 22.

Object 16 has a three-dimensional shape and is supported by the movable support member 14, e.g., by being in contact with upper surface 24 thereof as shown.

Closure 18 is adapted to assume a closed position, as shown in FIG. 6, to enclose the movable support member 14 within internal cavity 20.

Figure 1:
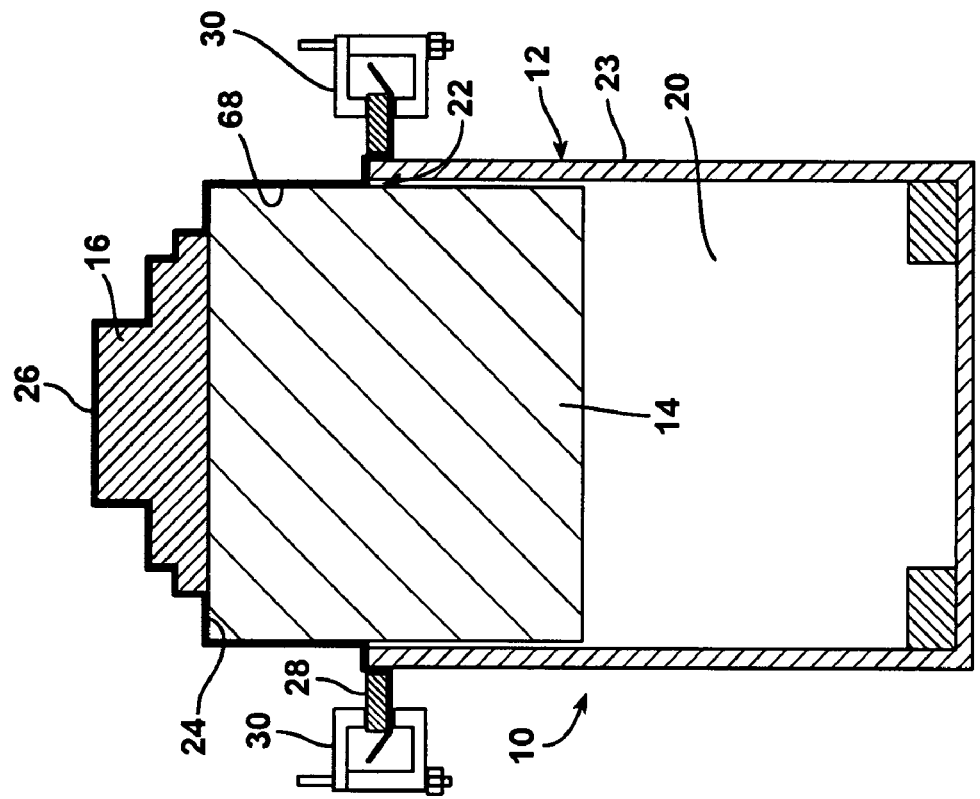
FIG. 1 is an elevational, cross-sectional view of a mold assembly and film for making a molded foam article in accordance with the present invention, including a movable support member and an object in contact with the support member.
Figure 2:
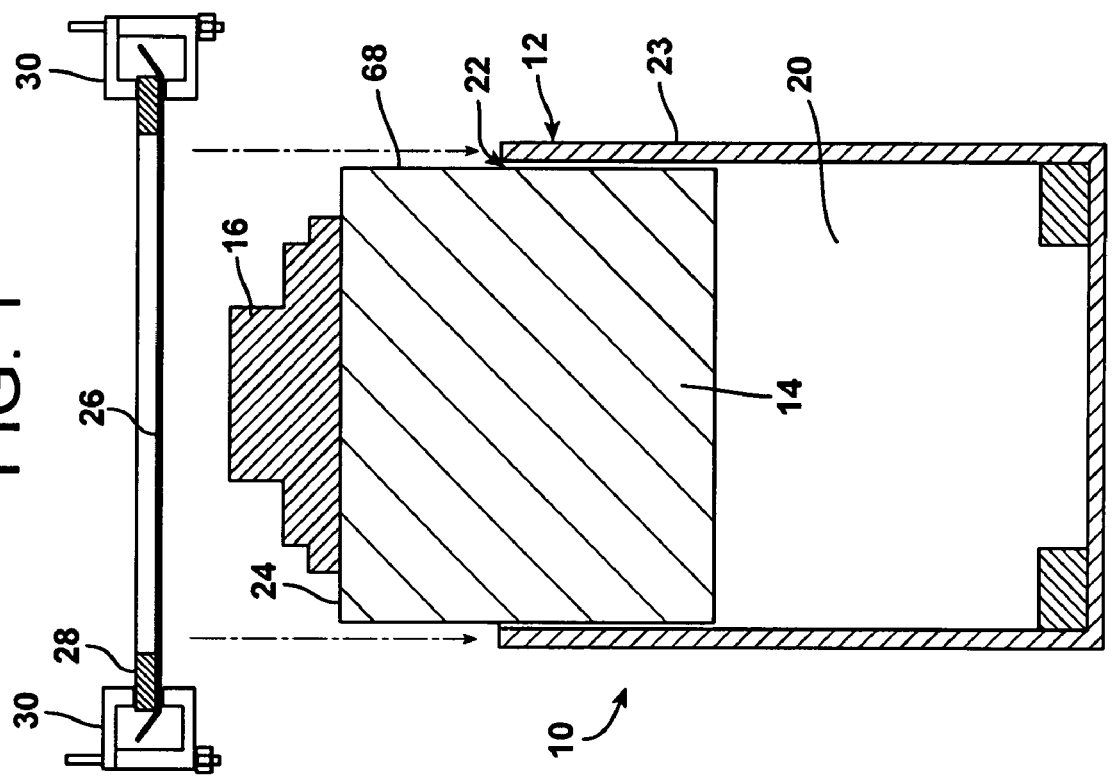
FIG. 2 is similar to the view shown in FIG. 1, except that the film has been secured over the object to thereby form a substantially convex envelopment over the object.

As shown in FIGS. 1-2, after moving support member 14 to its outer position, a film web 26 may be positioned over the object 16 to thereby form a substantially convex envelopment over the object as shown in FIG. 2. In some embodiments, e.g., in the presently-illustrated embodiment, the film web 26 may also be positioned over a portion of support member 14 such that the substantially convex film envelopment includes a portion of support member 14 as well as object 16 as shown. As may be discerned from FIG. 2, the term "convex" in this regard is as viewed from a reference point that is external to the mold assembly 10. Further, while the envelopment of the film web over the object and support member has a substantial, e.g., overall, convex configuration, in some embodiments, there may be small regions of the envelopment that are concave, e.g., where the object 16 has one or more recesses in the outer surface thereof such that the film web forms localized depressions or indentations within such recesses.

The positioning of film web 26 over the object 16 and, optionally, over support member 14 may be facilitated by employing a movable frame 28 to which the film web may be secured via one or more clamps 30 (two clamps shown). The frame may be positioned over the object and support member 16, 14 and moved downwards as shown in FIG. 1 to assume the substantially convex configuration shown in FIG. 2.

In some embodiments, it is desirable for the film web 26 to conform to the shape of the object 16 in the web's convex envelopment thereof. One way to accomplish this is to stretch the film web over the object while holding the film at a temperature at or below its softening point, which is a technique known as 'cold-stretching.' The film web may thus be forced to conform partially or completely to the shape of the object. Cold-stretching may comprise elastic deformation, in which the film can recover its original form if released, non-recoverable (inelastic) deformation, in which the film is stretched beyond its yield point and cannot return to its original form, or a combination of the foregoing two types of deformation.

The forced conformation of the film web to the object may be accomplished by applying an external force to the film, e.g., gas pressure, liquid pressure, pressure from an appropriately-shaped tool, a combination of the foregoing, etc., to force the film against the object and support member. Alternatively or in addition, a vacuum may be applied in the space between the object and the film, causing it to be pushed into close proximity to the object by the pressure of the surrounding atmosphere (discussed in further detail below).

Figure 10:
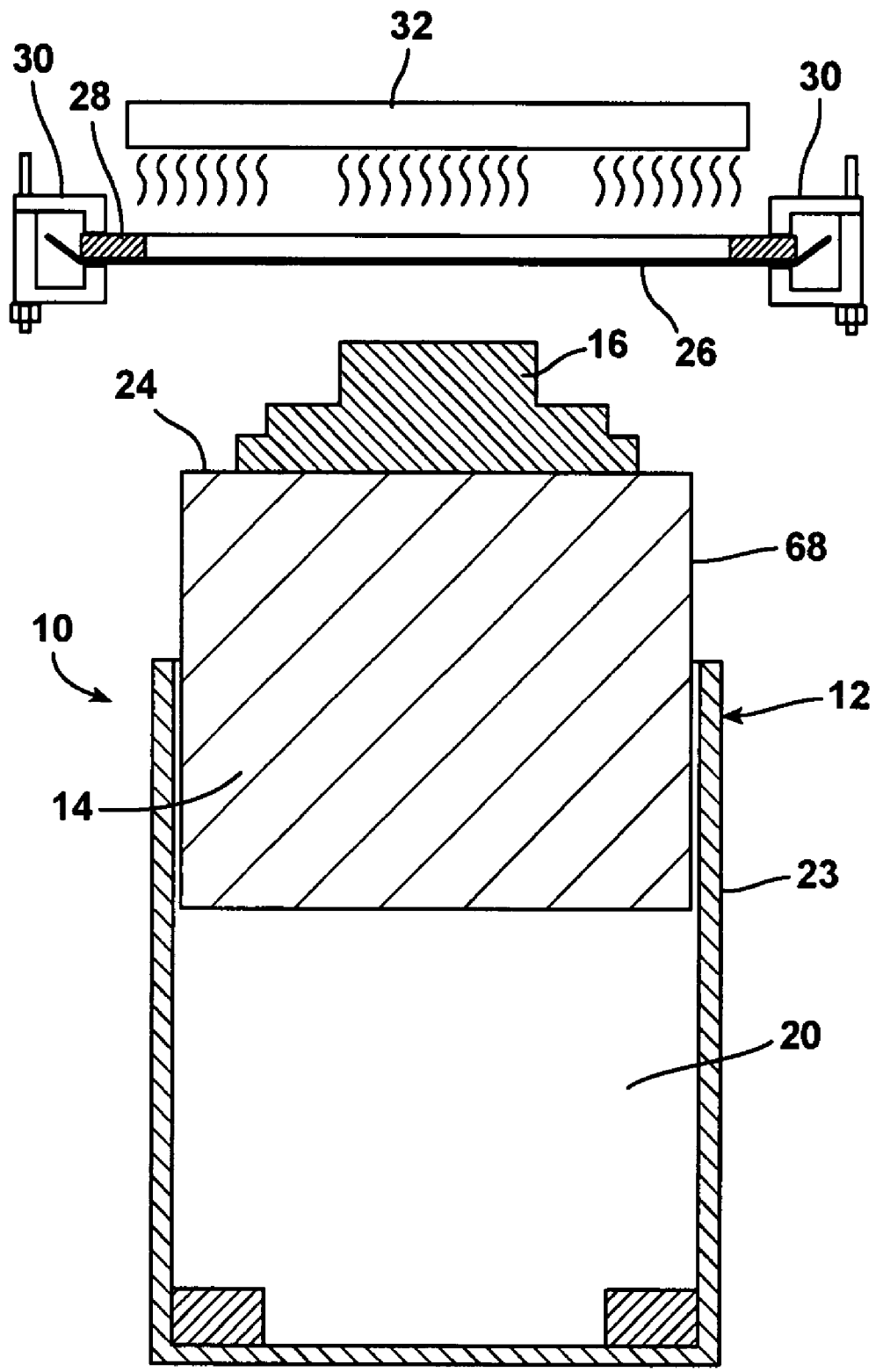
FIG. 10 illustrates an alternative embodiment similar to FIG. 1, wherein the film web is heated in order to thermoform it into the substantially convex envelopment shown in FIG. 2.

Another way to achieve close conformation between film web 26 and object 16 is to 'thermoform' the film web during the step of forming the substantially convex envelopment, wherein the film is heated to a temperature at or above its softening point, e.g., via radiant, conductive and/or convective heat transfer. This may be accomplished with a suitable heating device 32, which may be positioned above film web 26 as shown in FIG. 10. Such heating device 32 may be used with mold assembly 10 when it is desired to thermoform film web 26 into a substantially convex envelopment over object 16.

The heated film web may then be forced to conform partially or completely to the shape of the object. This may be done by simply allowing the weight of the hot film to induce the web to stretch and sag onto the object. Alternatively or in addition, external force, e.g., gas pressure, liquid pressure, pressure from an appropriately-shaped tool, static electric charge, a combination of the foregoing, etc., may be applied to push the film against the object and, optionally, the support member. As a further alternate or additional technique, a vacuum may be applied in the space between the object/support member and the heated film, causing it to be pushed into close proximity to the object by the pressure of the surrounding atmosphere. A still further alternative is to separately thermoform the film web into a shape which approximates the object, e.g., using one of the foregoing methods, and then transfer the 'pre-thermoformed' film onto the object.

After the heated film takes its new conformation, it may be allowed to cool while being held in close proximity to object 16.

As indicated above, another technique to achieve close conformation between film web 26 and object 16 is to apply a vacuum in the space between the object and the film web 26. The application of a vacuum in this regard may be employed alone, or in combination with either of the above-described cold-stretch or thermoforming techniques. Vacuum may, in general, be applied through the support member 14 and/or through the object 16.

Figure 11:
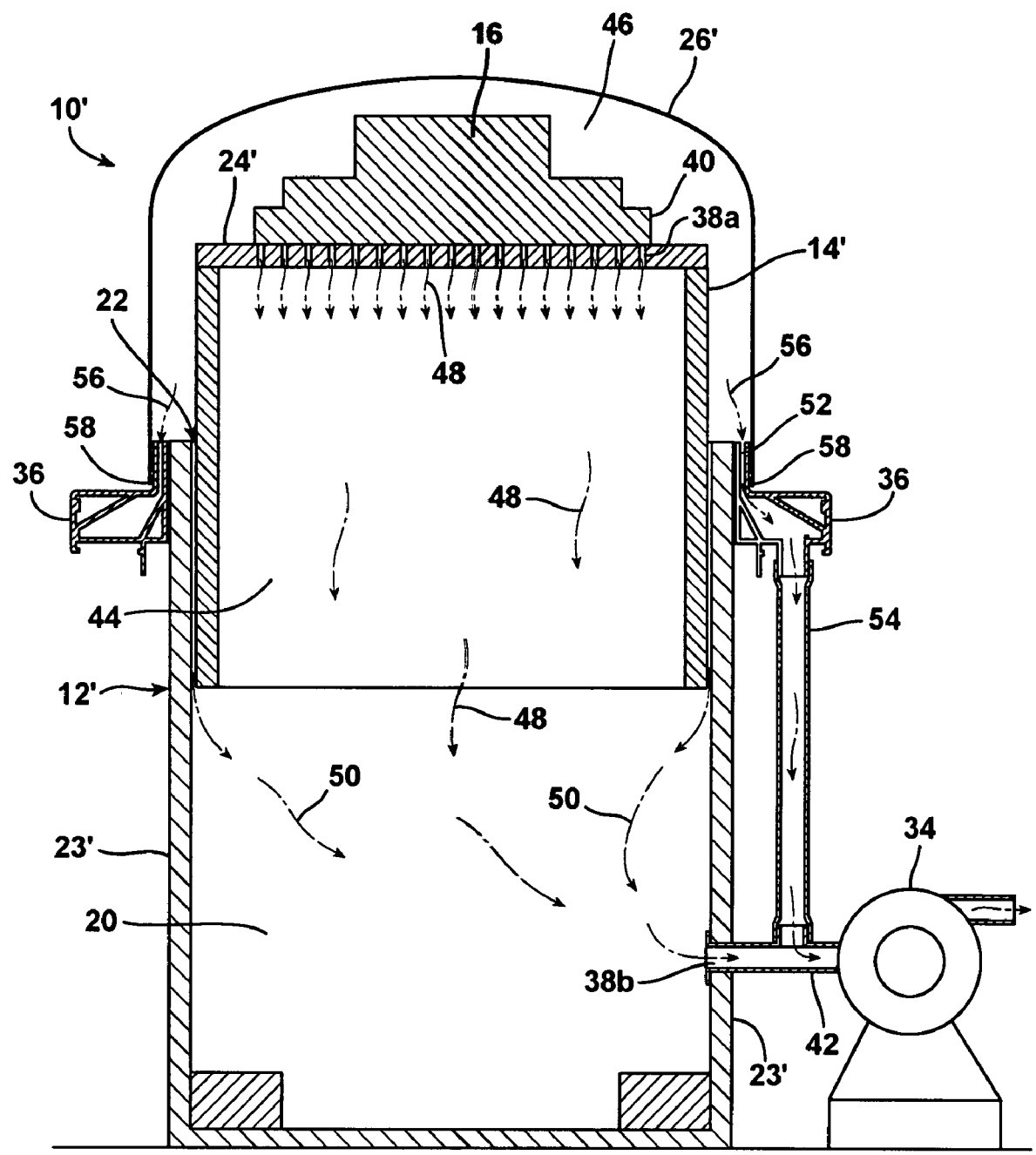
FIG. 11 illustrates an alternative embodiment similar to FIG. 2, in which the formation of the substantially convex envelopment includes applying a vacuum through the support member and/or object.

One embodiment for applying vacuum is illustrated in FIG. 11, which shows an alternative mold assembly 10'. Mold assembly 10' may be similar in most respects to mold assembly 10, except that it may generally further include a vacuum pump 34, vacuum manifold 36, and vacuum ports 38.

In the illustrated embodiment, an array of relatively small vacuum ports 38a may be formed in upper surface 24' of movable support member 14' to enable a vacuum to be applied through the support member 14'. In some embodiments, the vacuum ports 38a may be generally distributed, e.g., uniformly or randomly, in upper surface 24'. In other embodiments, the vacuum ports 38a may form a specific pattern. For example, the vacuum ports 38a may form a pattern that conforms generally or specifically to the outline of the base 40 of object 16 in order to pull the film web towards the intersection of the base 40 and upper surface 24' of movable support member 14' when vacuum is applied by vacuum pump 34. This causes the film to 'tuck' against the edge formed by the intersection of the periphery of base 40 of object 16 and the upper surface 24' of movable support member 14'. The closeness of such 'tuck' will, in general, be indirectly proportional to the spacing of the vacuum ports 38a relative to each other and to the periphery of base 40, and directly proportional to the strength ('pull') of the vacuum applied by vacuum pump 34.

Whether the vacuum ports 38a are generally or specifically distributed, fluid communication between vacuum pump 34 and vacuum ports 38a may be provided, as shown, by including one or more vacuum ports 38b in housing 12' and/or in movable support member 14'. In the illustrated embodiment, a vacuum port 38b is provided in a wall 23' of housing 12'. Vacuum port 38b allows fluid communication between internal cavity 20 and vacuum pump 34 via vacuum line (e.g., hose or pipe) 42. Also in the illustrated embodiment, the interior 44 of movable support member 14' fluidly communicates with internal cavity 20, e.g., via vacuum hose(s) or, as shown, by providing support member 14' with a bottom opening that resides within internal cavity 20 of housing 12'. In this manner, when vacuum pump 34 is activated, air or other fluid may be pulled from the space 46 between film web 26' and object 16/support member 14', whereupon such air, represented by arrows 48, flows through vacuum ports 38a, interior 44 of support member 14', and internal cavity 20 of housing 12', into vacuum port 38b, through vacuum line 42, and finally into and through vacuum pump 34.

As shown in FIG. 11, air from space 46 may also be caused to flow between movable support member 14' and walls 23' of housing 12'. Such air flow, represented by arrows 50, enters internal cavity 20 via opening 22, traverses the gap between support member 14' and walls 23', and exits cavity 20 via vacuum port 38b. Vacuum manifold 36 may be included to provide additional vacuum ports 52, which may be positioned adjacent opening 22 as shown. Fluid communication between vacuum pump 34 and manifold 36 may be provided by vacuum line 54 as shown. Air, represented by arrows 56, may thus flow into vacuum ports 52, through manifold 36 and vacuum line 54, and into/through vacuum pump 34 as shown.

As an alternative to the use of a movable frame 28 to hold film web 26 rather tautly as it is positioned over the object and support member as described above in connection with FIGS. 1-2, film web 26' as used with mold assembly 10' may be in the form of bag, e.g., a relatively loose, bag-like structure as shown in FIG. 11, which is positioned over object 16 and support member 14'. As also shown, the open edge 58 of the bag-shaped film web 26' may be fitted around and/or otherwise secured to manifold 36.

Figure 12:
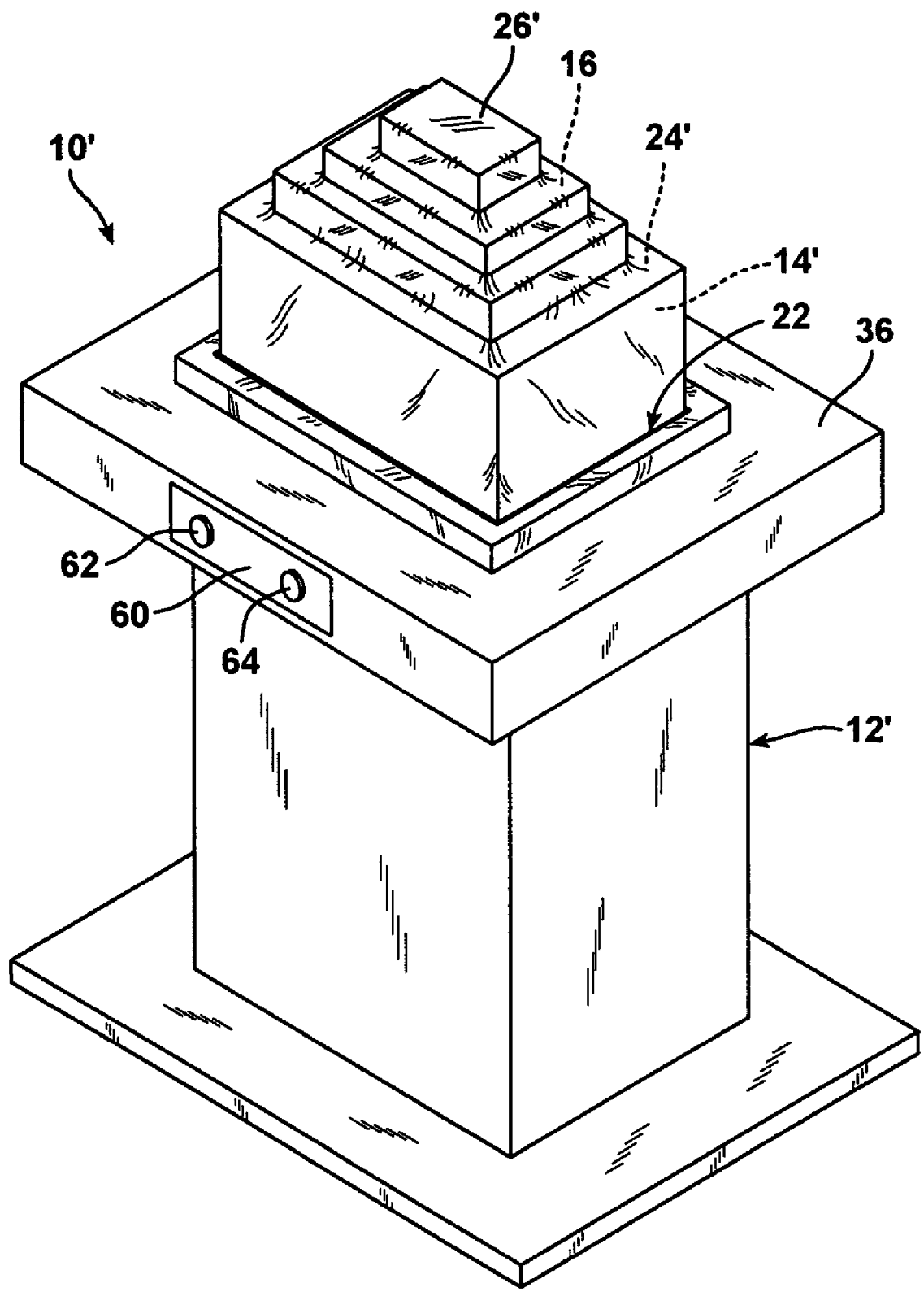
FIG. 12 is an isometric view of the assembly shown in FIG. 11, after vacuum has been applied through the support member and/or object to force the film web to closely conform to the contour of the support member and object.

FIG. 12 is an isometric view of the mold assembly 10' shown in FIG. 11, after vacuum has been applied by vacuum pump 34 (not shown in FIG. 12) as described immediately above. As shown, such application of vacuum has forced the film web 26' to closely conform to the contour of object 16 and also to a portion of the support member 14', i.e., that portion of the support member which extends from cavity 20. If desired, mold assembly 10' may include a control panel 60 or the like, which may contain a button or switch 62, e.g., to control the movement of support member 14', and a button or switch 64, e.g., to control the operation of vacuum pump 34.

As an alternative to the use of vacuum ports 38, the object 16 and/or support member 14' may be fabricated from porous materials, which allow air to be pulled through the object and/or support member by vacuum pump 34 or the like.

Figure 3:
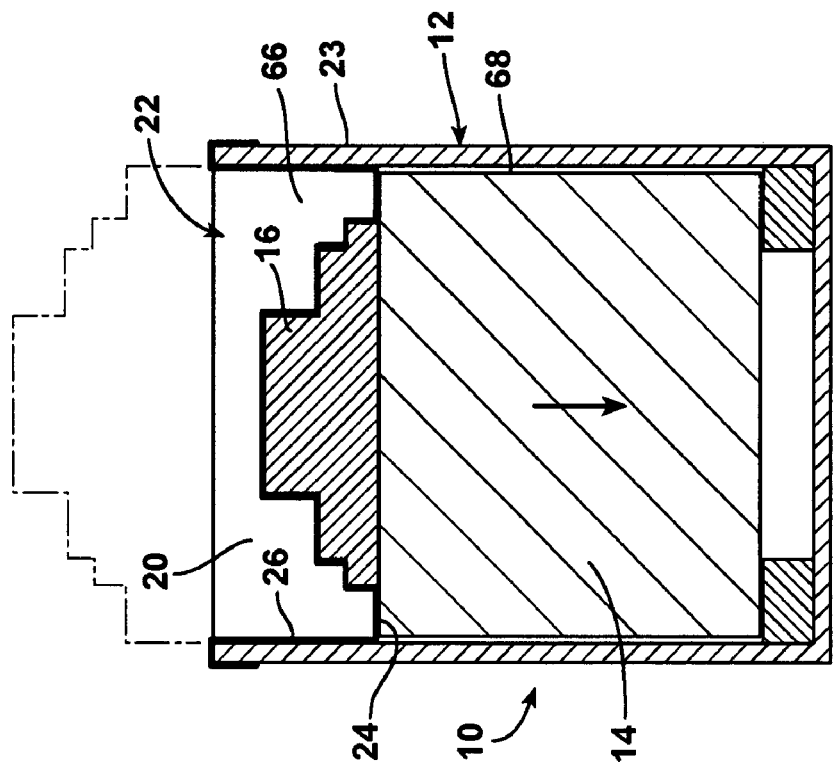
FIG. 3 is similar to FIG. 2, except that the support member is being moved to an inner position within the mold housing while maintaining the film web in contact with the object.

Referring back to FIGS. 1-9 generally, and to FIGS. 3-4 in particular, a further step in a method for making molded foam articles will be described. Once the film web 26 (or 26') has been positioned over object 16 and, optionally, support member 14 (or 14', etc.), the substantially convex envelopment shown in FIG. 2 is transformed into a partially concave envelopment, i.e., a film-lined mold cavity. As shown in FIGS. 3-4, this may be accomplished by moving support member 14 in the direction of the downward-pointing arrow to its inner position while maintaining film web 26 in contact with object 16. In this manner, the substantially convex film envelopment of FIG. 2 is reconfigured into a partially concave film envelopment, in which film web 26 forms a hollow space 66 of predetermined shape, and in which object 16 causes a portion of the film web to protrude into such hollow space 66 as shown in FIG. 4.

In the illustrated embodiment, as the support member 14 moves downwards into its inner position, portions of film web 26 in contact with support member 14 are transferred from the side walls 68 of the support member to the walls 23 bounding the internal cavity 20 of housing 12. Thus, when support member 14 is in its fully-lowered, inner position as shown in FIG. 4, walls 23 of housing 12 may partially define the overall shape of hollow space 66, with portions of film web 26 being interposed between walls 23 and hollow space 66. The resultant film envelopment thus becomes partially concave, i.e., from a perspective external to the mold assembly 10, inasmuch as the film now extends downwards into cavity 20 of housing 12 to form hollow space 66. At the same time, due to the three-dimensional shape of the object 16, it continues to protrude upwards from surface 24 of support member 14 and into such hollow space 66. The film envelopment in this stage of the process may thus be understood to be a "partial" concave envelopment, with the protrusion of object 16 providing a deviation from the overall concave configuration of film web 26. In the illustrated embodiment, the shape of the resultant hollow space 66 is determined by the object 16, upper surface 24 of support member 14, and walls 23 of housing 12, each of which supports and shapes film web 26.

FIG. 5 illustrates a further step in the present method, namely, dispensing a predetermined amount of a foamable composition 70 into hollow space 66, e.g., through opening 22. The hollow space 66 formed by the partially concave envelopment of film web 26 thus provides a pocket within which the foamable composition 70 is contained within mold assembly 10.

A device 72 may be included for dispensing foamable composition 70 into the hollow space 66. Foamable composition 70 may comprise a mixture of at least one polyol and at least one isocyanate, which react within hollow space 66 to form a polyurethane foam. Suitable devices for mixing polyols and isocyanates, and dispensing the resultant reactive mixture are well known in the art, including those devices disclosed, e.g., in U.S. Pat. Nos. 5,255,847, 5,950,875, 6,929, 193, and 6,996,956, the disclosures of which are hereby incorporated herein by reference thereto.

Other types of foam may also be dispensed as desired into hollow space 66, including foams comprising, e.g., polyesters, such as polyethylene terephthalate; polyolefins, such as polyethylene homopolymer, polyethylene copolymer, polypropylene homopolymer, polypropylene copolymer; polystyrenes; etc.

Figure 7:
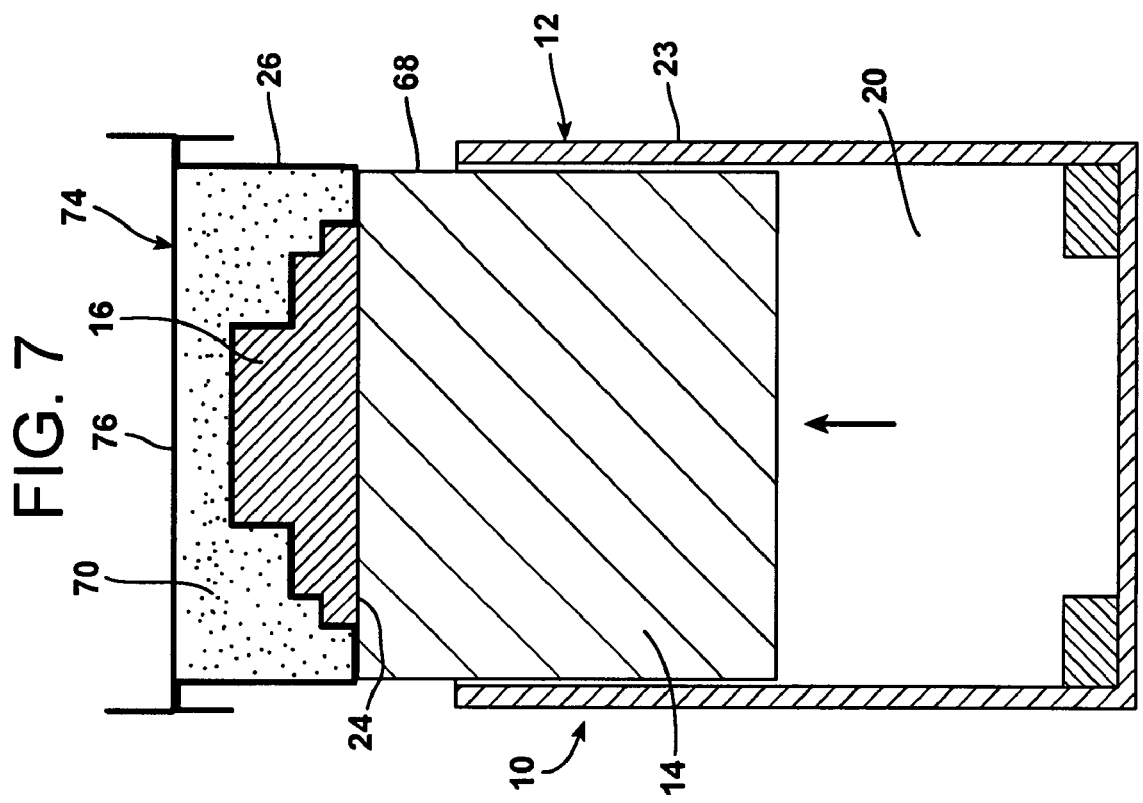
FIG. 7 is similar to FIG. 6, except that the resultant foam article is removed from the cavity by moving the support member to an outer position.

FIG. 6 illustrates the step of moving closure 18 to its closed position, which serves to contain the foamable composition 70 as it expands within hollow space 66. In this manner, the foamable composition 70 expands within hollow space 66 to form a molded foam article 74 as shown in FIG. 7. The molded foam article 74 substantially conforms to the predetermined shape of hollow space 66, with film web 26 forming at least a partial outer skin for the article.

In some embodiments, a second film web 76 may be applied over opening 22 such that it is interposed between closure 18 and foamable composition 70. In this manner, the second film web 76 becomes part of the outer skin for the article 74.

Removal of molded foam article 74 from mold assembly 10 may be facilitated by pushing the foam article from cavity 20, e.g., by moving support member 14 in the direction of the upward-pointing arrow to its outer position as shown in FIG. 7. While in this position, the foam article 74 may be manually, mechanically, pneumatically, etc. removed from upper surface 24 of the support member and placed in a container 78, e.g., a shipping container such as a corrugated box or the like as shown.

Figure 9:
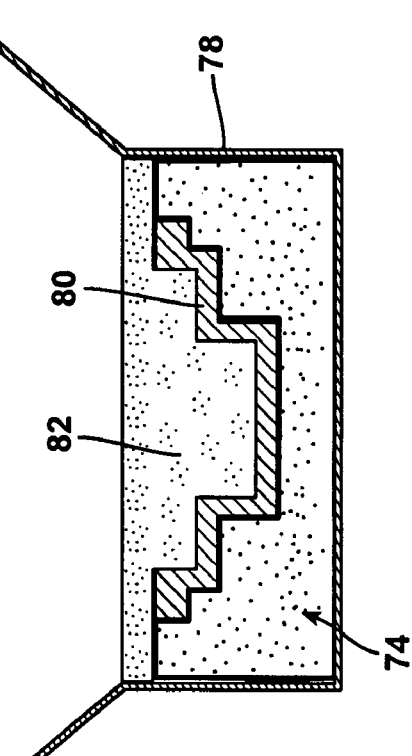
FIG. 9 illustrates the placement of a product in the container along with the molded foam article as shown in FIG. 8.

As illustrated in FIG. 9, a product 80 may be placed in container 78 along with molded foam article 74 in order to package such product, e.g., for shipment to an intended destination. Advantageously, the three-dimensional shape of object 16 may be selected to correspond, at least partially, to that of the product 80 to be packaged so that the product is ensconced within the molded foam article 74 in container 78 as shown. When the molded foam article 74 is employed as a packaging cushion in this manner, the 'custom fit' between the article 74 and product 80 provides an optimal level of protection for the product. Additional protection may be provided by including a second cushion 82 in container 78 as shown, e.g., a 'foam-in-bag' cushion as described in the above-incorporated patents, in order to fill any remaining void spaces within the container 78.

Referring now collectively to FIGS. 13-21, an alternative embodiment in accordance with the present invention will be described. In this embodiment, the object that is in contact with the movable support member, and which causes a portion of the film web to protrude into the hollow space when the support member is in the inner position and the film web forms a partially concave envelopment, is a product to be packaged, wherein the resultant molded foam article forms a packaging cushion for the product/object. In other words, in this embodiment, the molded foam article is formed around the actual product, instead of using an object as a proxy for the product.

Like mold assembly 10, alternative mold assembly 110 includes a housing 112, a movable support member 114, and a closure 118 (FIG. 19). Instead of an object 16, however, a product 180 to be packaged is supported by the support member, e.g., by being placed directly or, as shown, indirectly, in contact with support member 114. In the illustrated embodiment, a mounting base 115 and pedestal 117 are employed to space the product 180 from the upper surface 124 of movable support member 114. Thus, in the context of the presentlydescribed method, the product 180, pedestal 117, and mounting base 115 may be understood to collectively form an "object" 116.

Housing 112 includes an internal cavity 120 and an opening 122 into the cavity. Housing 112 may further include one or more walls 123 such that the cavity 120 is bounded, at least in part, by such wall(s) 123.

Support member 114 is generally movable between an inner position (FIGS. 17-19), in which the support member is substantially contained within internal cavity 120, and an outer position (FIGS. 13-15 and 20), in which at least a portion of the support member extends outside of cavity 120.

In FIG. 14, support member 114 is in its outer position, and a film web 126 is positioned over the "object" 116, i.e., over product 180 on pedestal 117 as mounted on base 115. The film web 126 may also be positioned over the portion of support member 114 that extends from housing 112, i.e., from cavity 120 thereof. In this manner, the film web 126 forms a substantially convex envelopment over the object 116 (product 180/pedestal 117/base 115) and extended portion of support member 114. In the illustrated embodiment, film web 126 is a somewhat loose-fitting, bag-like structure having an opening/open edge 158, which may be fitted around and/or otherwise secured to housing 112 near opening 120 thereof (securing means not shown).

Figure 15:
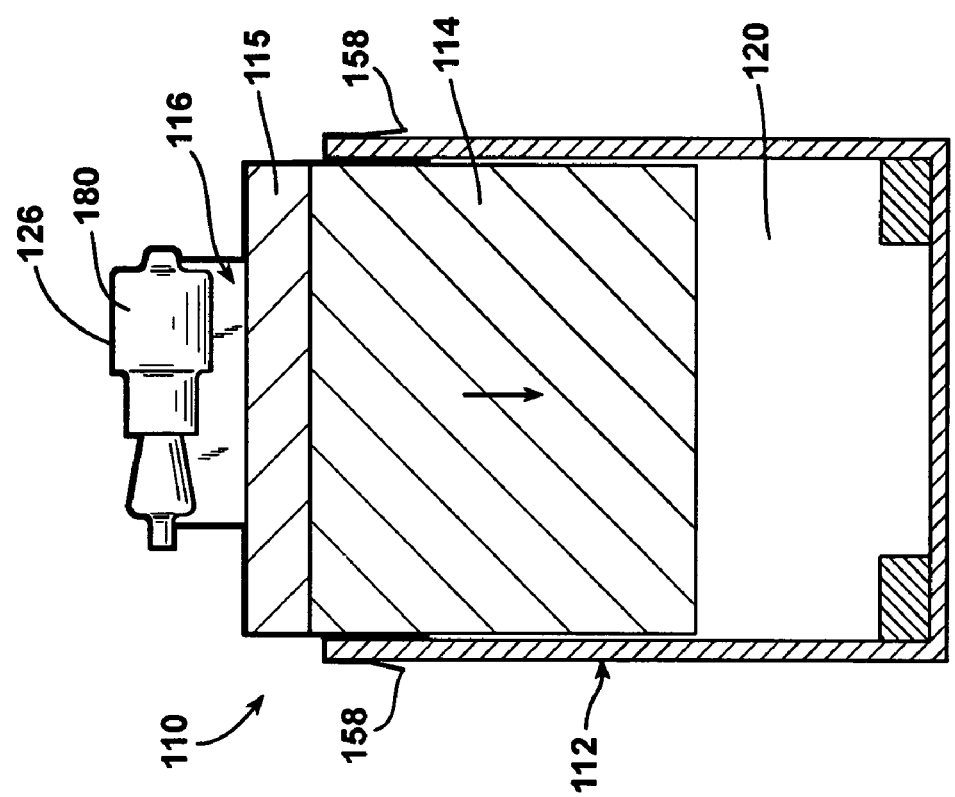

As shown in FIG. 15, the film web 126 may be caused to more closely conform to the outline or shape of the object 116 and support member 114 in the web's convex envelopment thereof. This may be accomplished in any desired and/or conventional manner, e.g., by employing one or more of the above-described techniques, including cold-stretching, thermoforming, and/or vacuum-forming.

Figure 16:
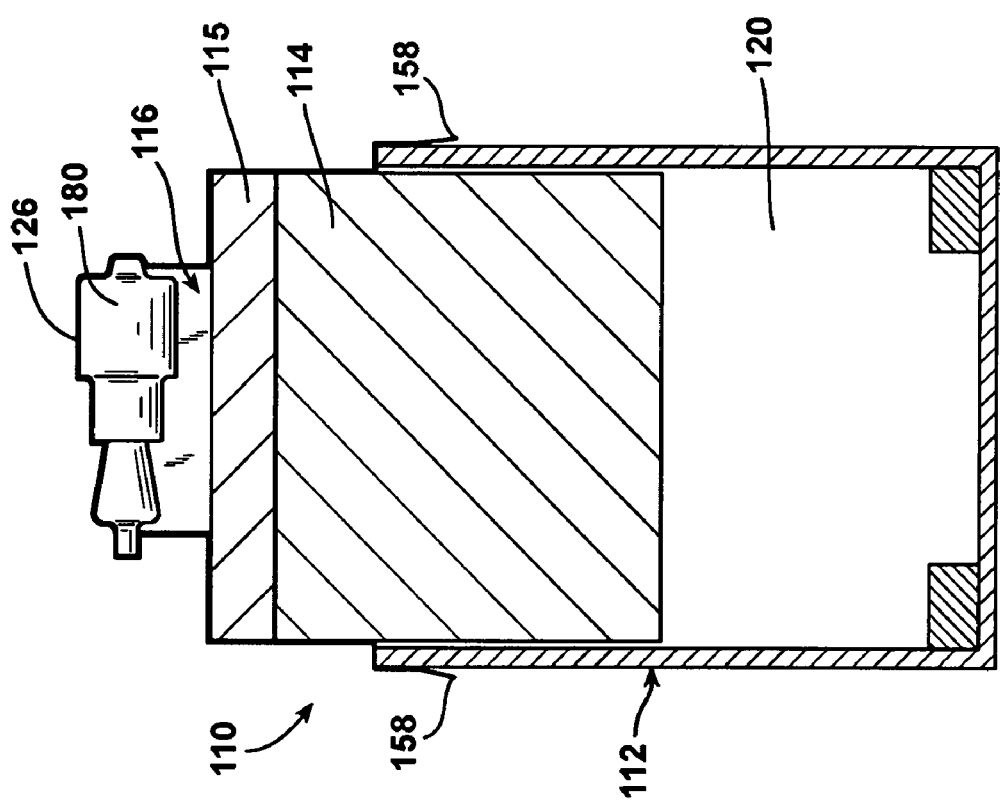
Figure 17:
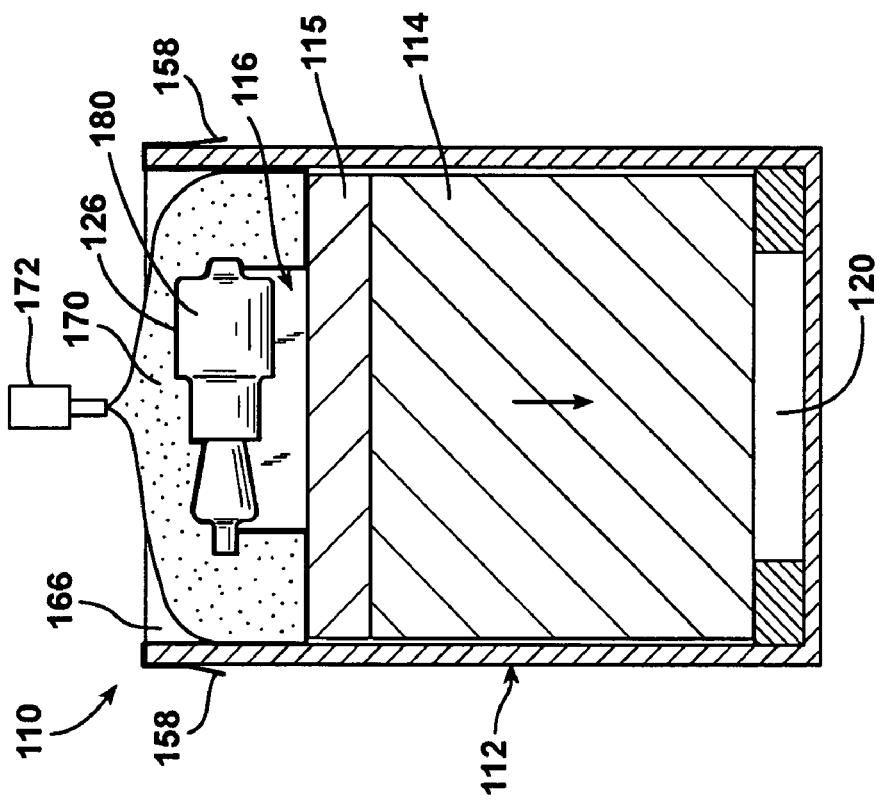

FIGS. 16-17 illustrate the transformation of the substantially convex envelopment of film web 126, as shown in FIGS. 14-15, into a partially concave envelopment. As with the previously-described method as shown in FIGS. 1-7, this may be accomplished by moving support member 114 to its inner position while maintaining film web 126 in contact with object 116. In this manner, the substantially convex film envelopment of, e.g., FIG. 15 is reconfigured into a partially concave film envelopment, in which film web 126 forms a hollow space 166 of predetermined shape, and in which object 116 causes a portion of the film web 126 to protrude into such hollow space 166 as shown in FIG. 17.

Figure 18:
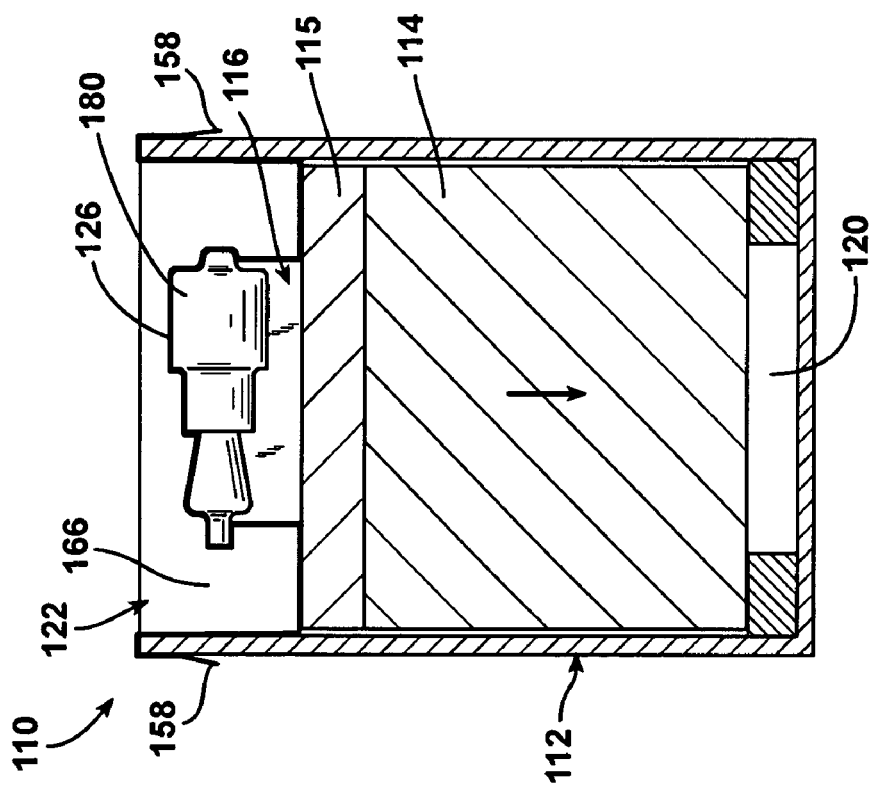

FIG. 18 illustrates a further step in the present method, namely, dispensing a predetermined amount of a foamable composition 170 into hollow space 166, e.g., through opening 122. The hollow space 166, formed by the partially concave envelopment of film web 126, provides a pocket within which the foamable composition 170 is contained within mold assembly 110. The dispensing device 172 and foamable composition 170 dispensed therefrom may be as described above relative to device 72 and composition 70.

In FIG. 19, closure 118 has been moved to its closed position, which serves to contain the foamable composition 170 as it expands within hollow space 166. In this manner, the foamable composition 170 expands within hollow space 166 to form a molded foam article 174 as shown in FIG. 20. As also shown, the molded foam article 174 substantially conforms to the predetermined shape of hollow space 166, with film web 126 forming an outer skin for the article.

In this embodiment, a second film web is not interposed between closure 118 and foamable composition 170. Instead, the inner surface 119 of closure 118 may be formed of a material that does not adhere to, i.e., releases from, the foamable composition 170 so that the closure 118 may be readily removed, e.g., opened, after the molded foam article 174 has been completed.

Figure 21:
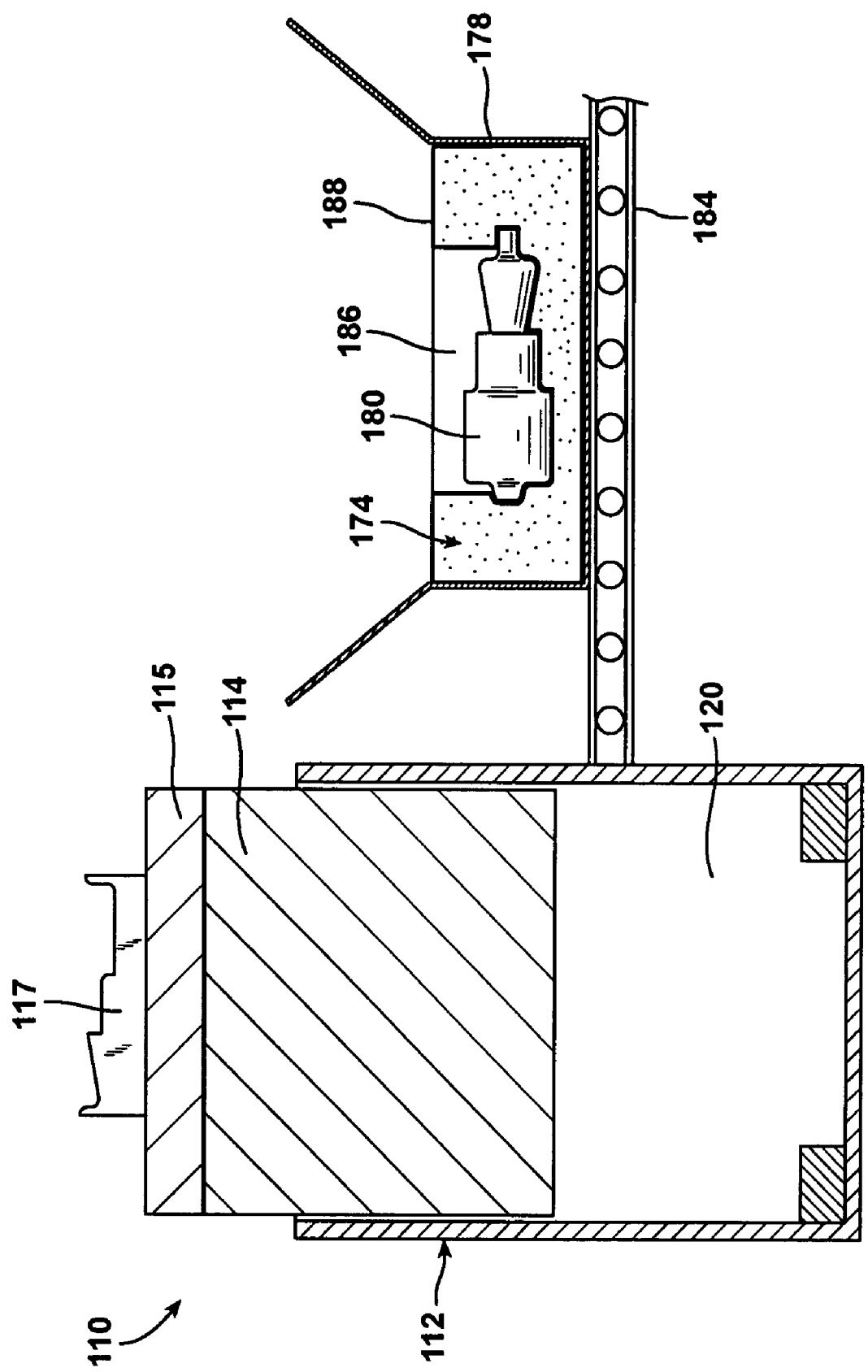

From the configuration shown in FIG. 20, i.e., with support member 114 in its outer position, the molded foam article 174 with product 180 therein may be manually, mechanically, pneumatically, etc. removed from support member 114 and placed in a container 178 as shown in FIG. 21, e.g., a shipping container such as a corrugated box or the like. The container 178 with molded foam article 174/product 180 therein may be placed on a conveyor 184 or the like for ease of transport to another location, e.g., a truck-loading dock. Pedestal 117 and mounting base 115 are thus left in the position shown on support member 114, and ready to receive another product 180 to begin the above-described process again.

As shown, the molded foam article 174/product 180 may be placed in container 178 in an inverted configuration relative to their orientation on support member 114. If desired, a second cushion may be placed atop product 180, e.g., in open space 186 where pedestal 117 had been. However, since product 180 is contained within molded foam article 174, i.e., spaced from outer surface 188 of the article 174, a second foam cushion may be omitted as shown in FIG. 21.

Figure 22:
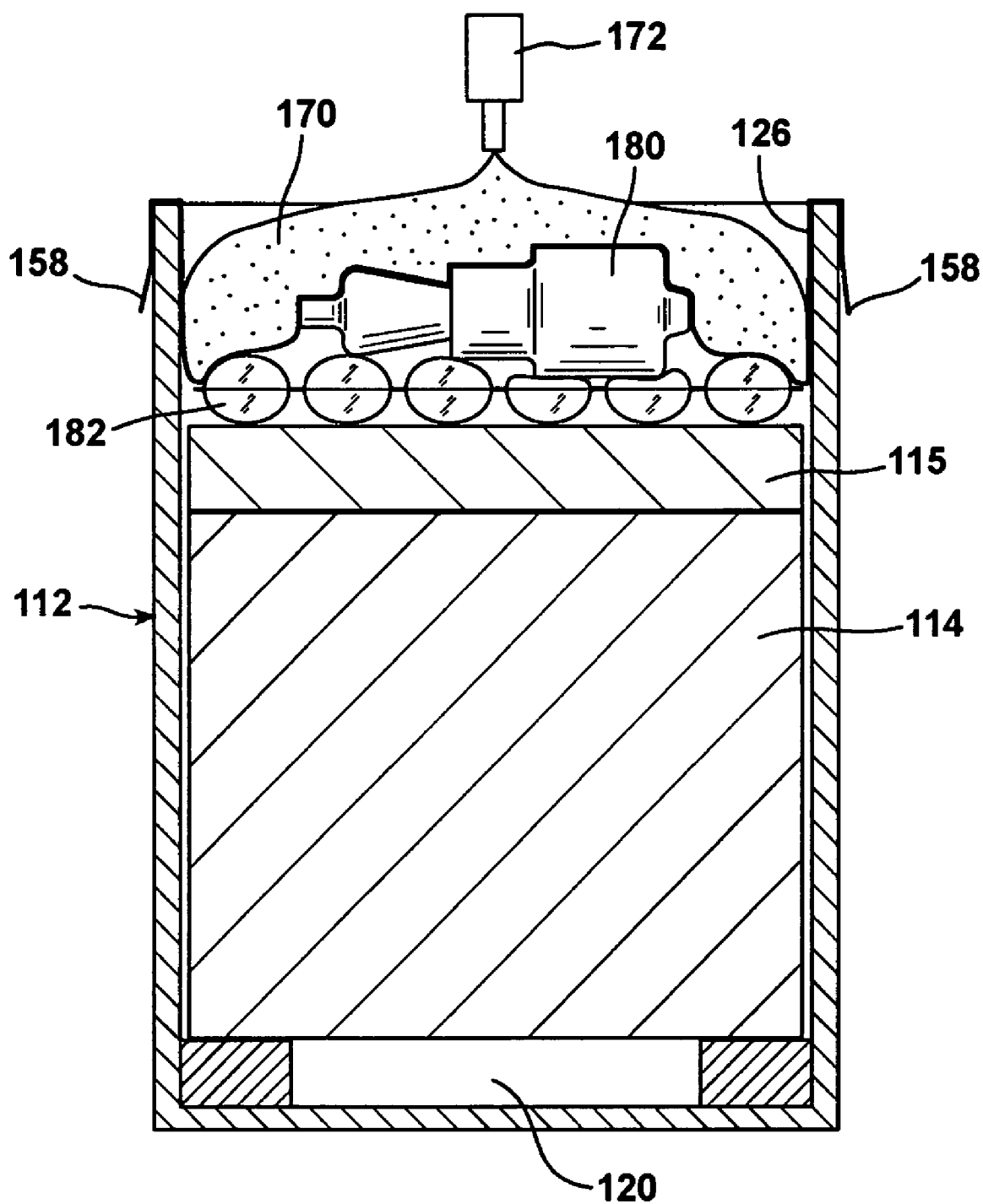
FIG. 22 is similar to FIG. 18, except that a cushion is used in place of the pedestal to space the product from the mounting base.

Alternatively, a second cushion 182 may be incorporated into the process of making the molded foam cushion as illustrated in FIG. 22. FIG. 22 is similar to FIG. 18, except that a cushion 182 is used in place of pedestal 117 to space the product 180 from mounting base 115. The cushion 182 can then be included as a 'built-in' second cushion, along with the product and resultant molded foam article, in the final package, e.g., as in FIG. 21. In the embodiment illustrated in FIG. 22, cushion 182 is in the form of a cellular-type cushion, e.g., comprising an array of discrete or communicating air-filled cells.

FIGS. 23-28 illustrate a further alternative method for making a molded foam article, which is similar to the method illustrated in FIGS. 13-21, except that the mold housing comprises a shipping container. Alternative mold assembly 210 may thus include a movable support member 214 on which mounting base 115 and pedestal 117 may be positioned as described above. Once again, instead of using a 'proxy-type' object, i.e., where the object is a proxy for the product to be packaged, the actual product 180 itself may be mounted on the pedestal 117, with the product 180, pedestal 117, and mounting base 115 collectively forming an "object" 116 around which the molded foam article will be formed.

Moreover, in this embodiment, the mold housing 212 may include a shipping container 278, which may form an upper portion of the mold housing 212, and be secured to a lower mold housing portion 213 as shown. For example, container 278 may be a corrugated box, which is dimensioned to fit over the lower housing portion 213 in a sleeve-like fashion when upper and lower flaps 290, 292 are open as shown. As also shown, the container 278 may be positioned in an inverted configuration on lower housing portion 213, i.e., with lower flaps 292 positioned above upper flaps 290. In general, container 278 may have any desired configuration or be constructed from any desired material in order to accommodate the particular product being shipped. Such containers are well-known in the art and may comprise metal, paper (e.g., corrugated fiber-board), plastic, etc.

In this embodiment, the two major components of housing 212, i.e., container 278 and lower housing portion 213, may together define an internal cavity 220. In the illustrated configuration of housing 212, container 278 provides an opening 222 into the cavity 220, e.g., via opened lower flaps 292.

Support member 214 is generally movable between an inner position (FIGS. 25-26), in which the support member is substantially contained within internal cavity 220, and an outer position (FIGS. 23-24 and 27), in which at least a portion of the support member extends outside of cavity 220.

Figure 23:
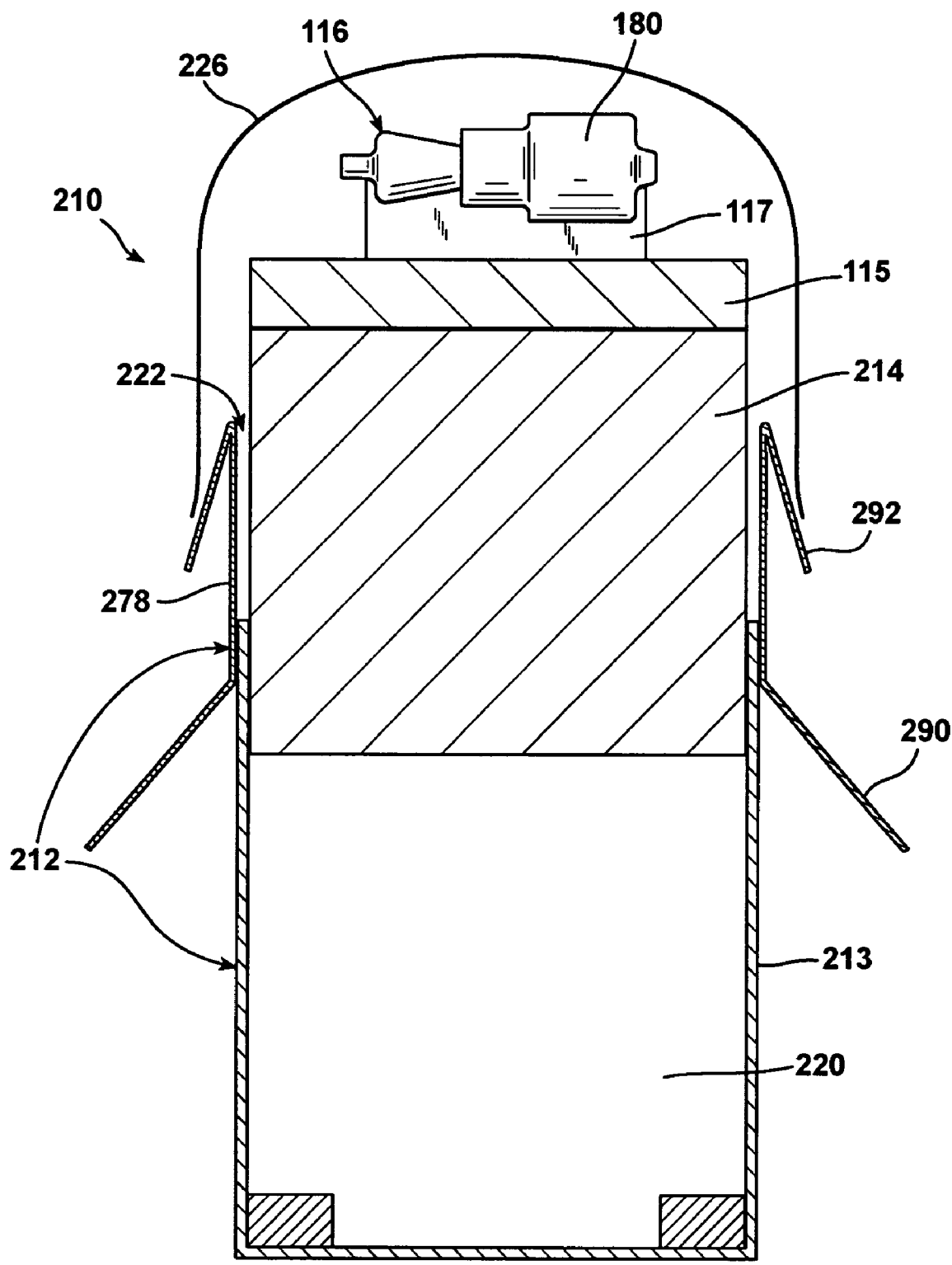
FIGS. 23-28 illustrate a further alternative method for making a molded foam article, which is similar to the method illustrated in FIGS. 13-21, except that the mold housing comprises a shipping container.

In FIG. 23, support member 214 is in its outer position, and a film web 226 is positioned over the "object" 116, i.e., over product 180 on pedestal 117 as mounted on base 115. The film web 226 may also be positioned over the portion of support member 214 that extends from housing 212, i.e., from cavity 220 thereof. In this manner, the film web 226 forms a substantially convex envelopment over the object 116 (product 180/pedestal 117) and extended portion of support member 214. In the illustrated embodiment, film web 226 is a somewhat loose-fitting, bag-like structure having an opening/open edge 258, which may be fitted around and/or otherwise secured to housing 212 near opening 220 at opened lower flaps 292 of container 278 (securing means not shown).

Figure 24:
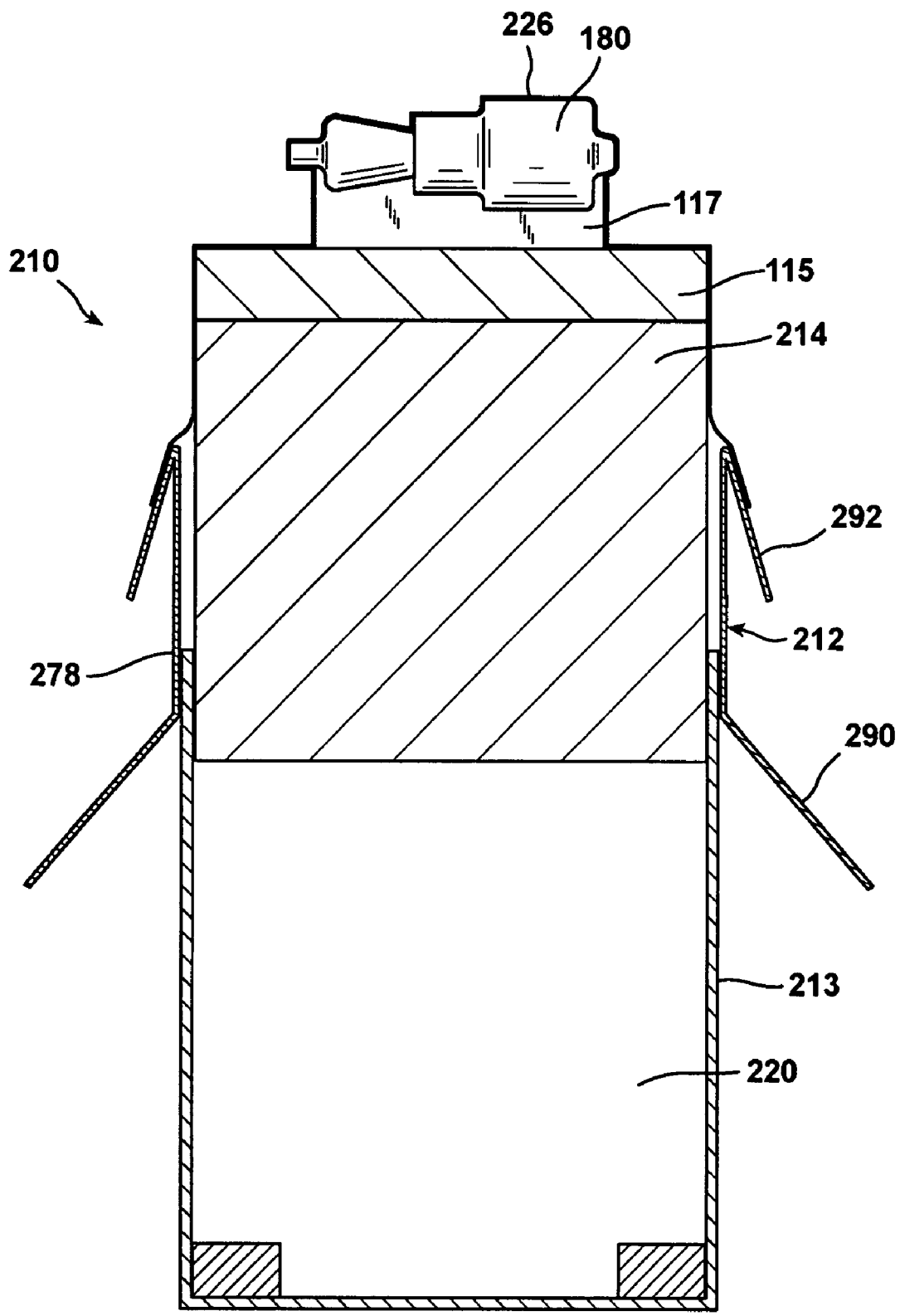

As shown in FIG. 24, the film web 226 may be caused to more closely conform to the outline or shape of the object 116 in the web's convex envelopment thereof. This may be accomplished in any desired and/or conventional manner, e.g., by employing one or more of the above-described techniques, including cold-stretching, thermoforming, and/or vacuum-forming.

Figure 25:
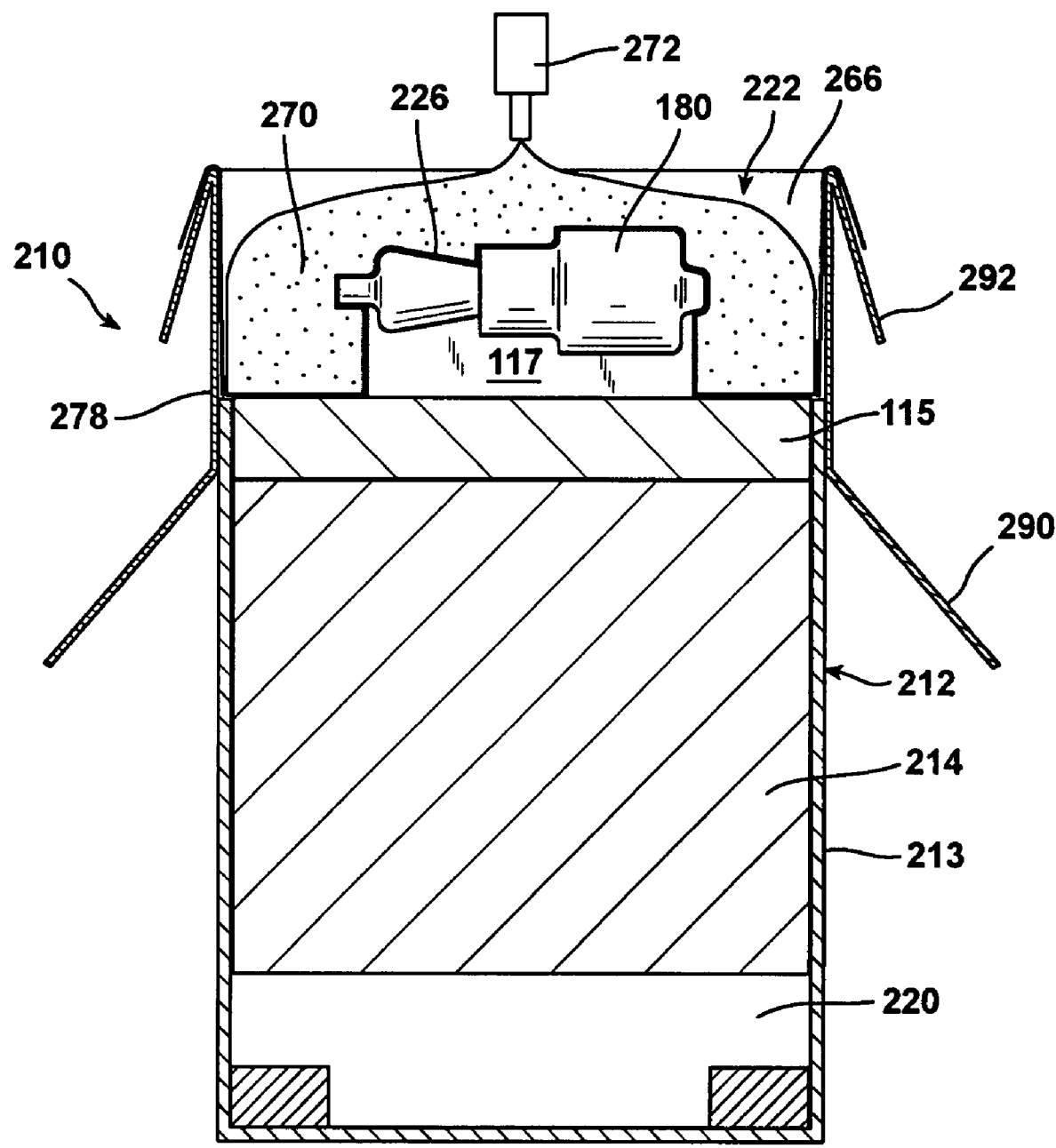

In FIG. 25, the substantially convex envelopment of film web 226, as shown in FIGS. 23-24, has been transformed into a partially concave envelopment by moving support member 214 to its inner position while maintaining film web 226 in contact with object 116. Also in FIG. 25, a predetermined amount of a foamable composition 270 is being dispensed into hollow space 266 via opening 222. The hollow space 266 formed by the partially concave envelopment of film web 226 provides a pocket within which the foamable composition 270 is contained within mold assembly 210. The dispensing device 272 and foamable composition 270 dispensed therefrom may be as described above.

Figure 26:
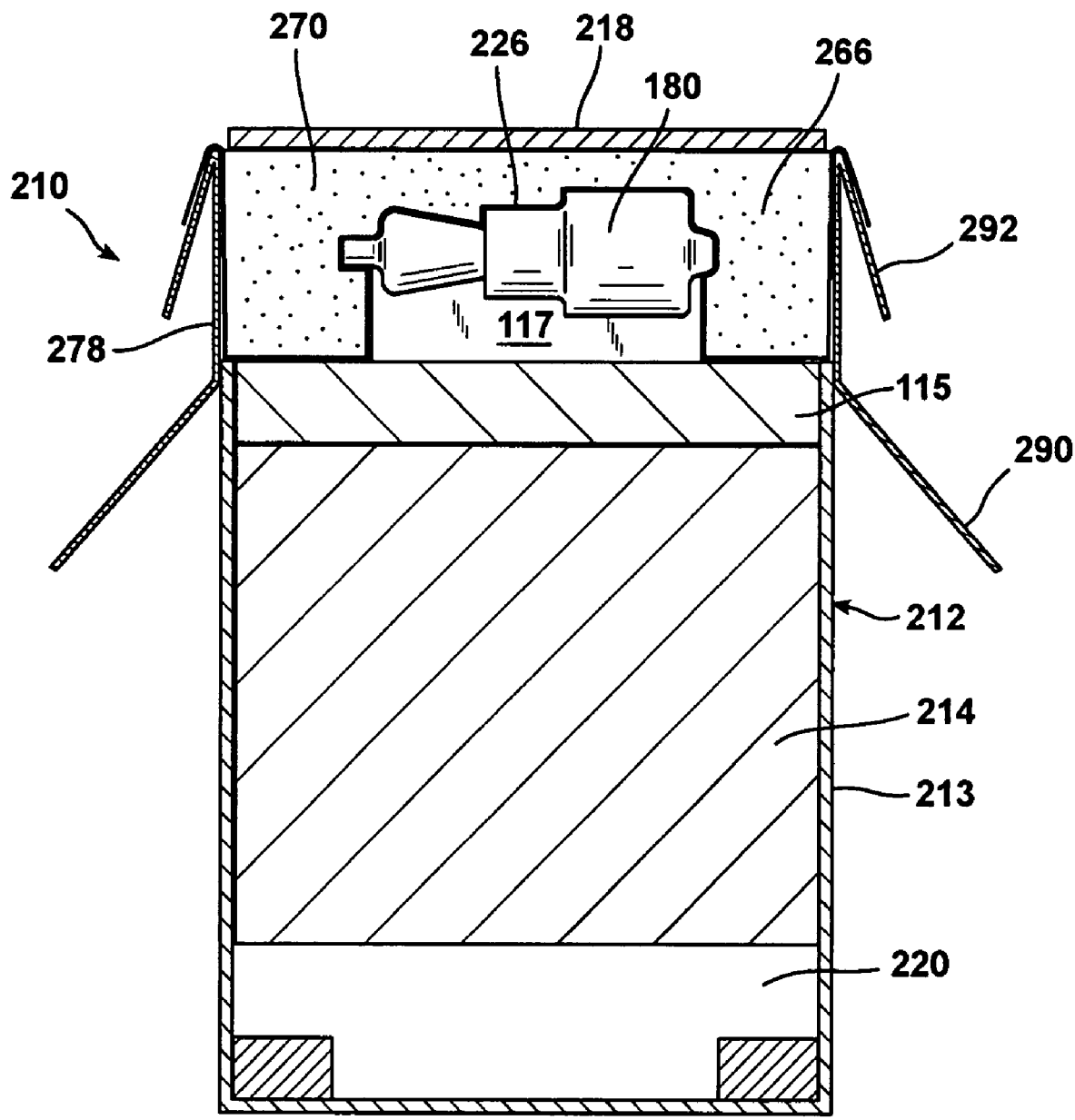
Figure 27:
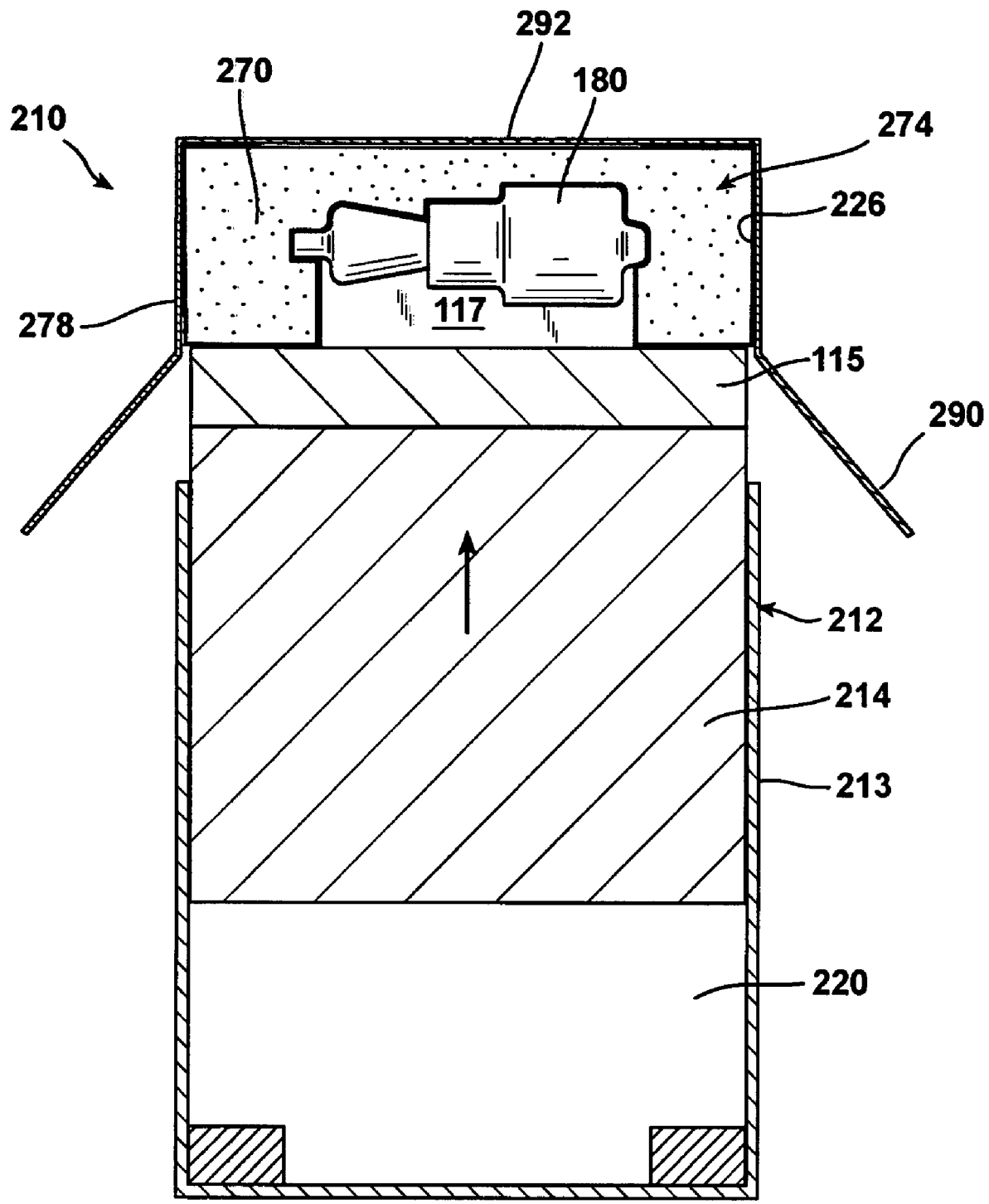

In FIG. 26, a closure 218 has been moved to its closed position, which serves to contain the foamable composition 270 as it expands within hollow space 266 to form a molded foam article 274 as shown in FIG. 27. As also shown, the molded foam article 274 substantially conforms to the predetermined shape of hollow space 266, with film web 226 forming an outer skin for the article.

Figure 28:
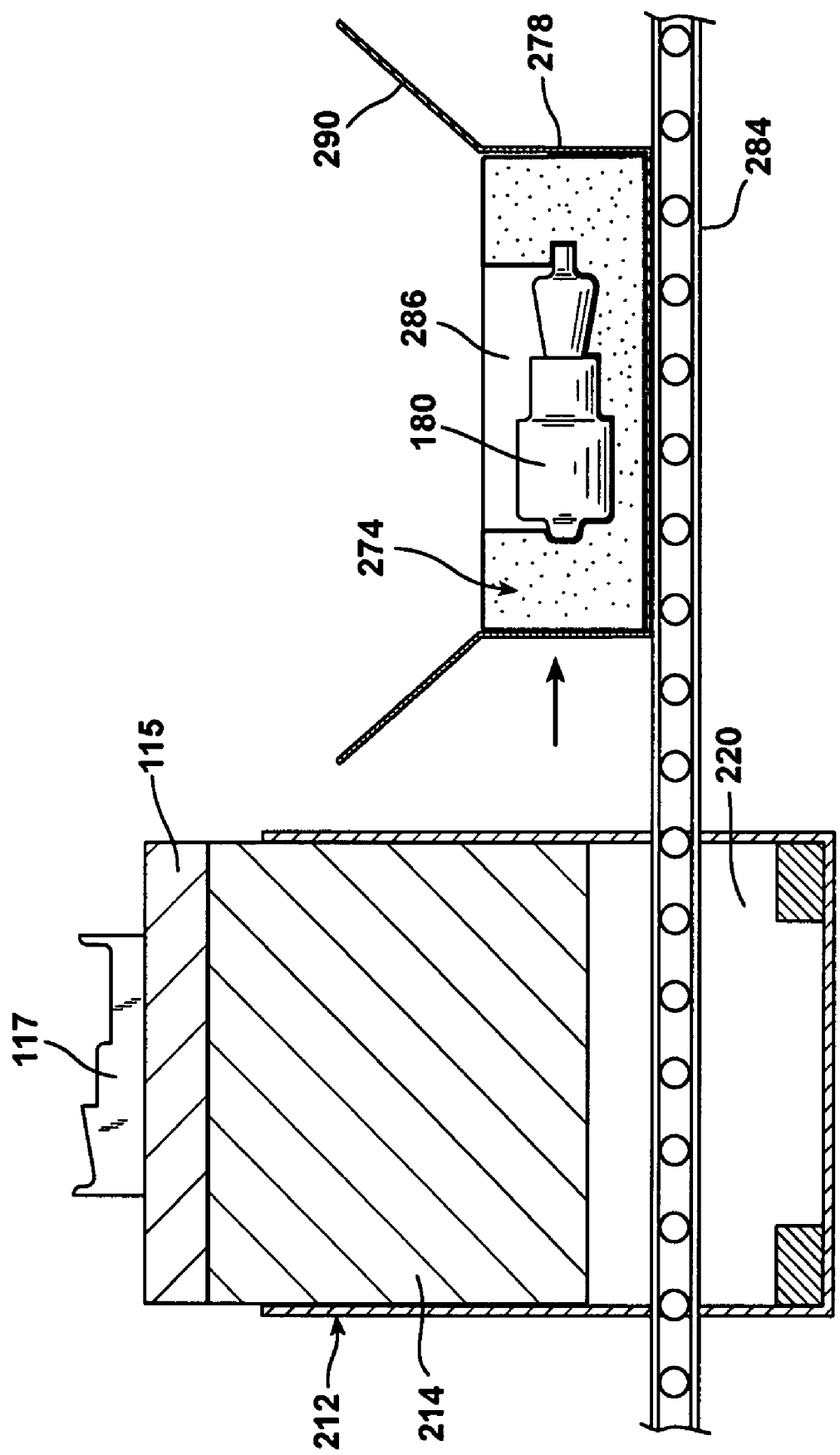

Advantageously, the shipping container 278 may be removable from the mold assembly 210. In this manner, once the molded foam article 274 has been formed around product 180, the shipping container 278 with molded foam article 274 and product 180 therein may be removed as an integral unit from mold assembly 210 for shipment thereof to an intended destination. Thus, lower flaps 292 of container 278 may be closed and then the integral unit may be removed from mold assembly 210, inverted, and placed on a conveyor 284 or the like for ease of transport to another location, e.g., a truck-loading dock, as shown in FIG. 28. A second cushion may optionally be placed atop product 180, e.g., in open space 286 where pedestal 117 had been, prior to closing upper flaps 290 of container 278. Once the upper flaps 290 are closed, the resultant package is complete and ready for shipment.

In other embodiments, an external container 78, 178, 278 may be omitted and the molded foam article 74, 174, 274 itself may serve as the shipping container, with the exterior skin formed by film web 26, 126, 226 providing abuse and moisture resistance to the container.

Film web 26, 126, 226 may, in general, comprise any flexible material that can be manipulated as described herein to produce molded foam articles, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other polymeric materials may also be used such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known extrusion process by melting the component polymer(s) and extruding, coextruding, or extrusion-coating them through one or more flat or annular dies.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A method for making a molded foam article, comprising:
   a. providing a mold assembly, comprising
      (1) a housing having an internal cavity and an opening into said cavity,
      (2) a movable support member, said support member being movable between
         (a) an inner position, in which said support member is substantially contained within said cavity, and
         (b) an outer position, in which at least a portion of said support member extends outside of said cavity via said opening,
      (3) an object having a three-dimensional shape and being supported by said support member, and
      (4) a closure, which is adapted to assume a closed position to enclose said support member within said cavity;
   b. moving said support member to said outer position;
   c. positioning a film web over said object to thereby form a substantially convex envelopment over said object;
   d. moving said support member to said inner position while maintaining said film web in contact with said object to thereby reconfigure said substantially convex film envelopment into a partially concave film envelopment, wherein said film forms a hollow space of predetermined shape and said object causes a portion of said film to protrude into said hollow space, and wherein said cavity is bounded by one or more walls that partially define the predetermined shape of said hollow space, said film web being interposed between said walls and said hollow space;
   e. dispensing a predetermined amount of a foamable composition into said hollow space; and
   f. moving said closure to said closed position,
   whereby, said foamable composition expands within said hollow space to form a molded foam article that substantially conforms to said predetermined shape, with said film web forming at least a partial outer skin for said article.

2. The method of claim 1, wherein the step of positioning said film web over said object to form said convex envelopment includes thermoforming said film web.

3. The method of claim 1, wherein the step of positioning said film web over said object to form said convex envelopment includes stretching said film web.

4. The method of claim 1, wherein the step of positioning said film web over said object to form said convex envelopment includes applying a vacuum through at least one of said support member and said object.

5. The method of claim 1, wherein said step of moving said closure to said closed position includes applying a second film web over said opening, wherein said second film web becomes part of the outer skin for said article.

6. The method of claim 1, further including the step of pushing the foam article from said cavity by moving said support member to said outer position.

7. The method of claim 1, wherein said method comprises the further step of placing said molded foam article in a container along with a product to be packaged within the container.

8. The method of claim 7, wherein the three-dimensional shape of said object corresponds at least partially to that of the product to be packaged.

9. The method of claim 1, wherein said object is a product to be packaged, with said molded foam article forming a packaging cushion for the product.

10. The method of claim 9, wherein
    said mold housing comprises a shipping container, which is removable from said mold assembly; and
    said method includes the further step of removing said shipping container, product, and molded foam article from said mold assembly.

11. The method of claim 1, wherein said film web is in the form of a bag.

* * * * *